(12) United States Patent
Maleki et al.

(10) Patent No.: US 10,600,237 B2
(45) Date of Patent: *Mar. 24, 2020

(54) RESOLUTION ENHANCED 3D RENDERING SYSTEMS AND METHODS

(71) Applicant: BITANIMATE, INC., Lake Oswego, OR (US)

(72) Inventors: Behrooz Maleki, West Linn, OR (US); Sarvenaz Sarkhosh, West Linn, OR (US)

(73) Assignee: BITANIMATE, INC., Lake Oswego, OR (US)

(*) Notice: Subject to any disclaimer, the term of this patent is extended or adjusted under 35 U.S.C. 154(b) by 0 days.

This patent is subject to a terminal disclaimer.

(21) Appl. No.: 16/162,241

(22) Filed: Oct. 16, 2018

(65) Prior Publication Data
US 2019/0156556 A1    May 23, 2019

Related U.S. Application Data

(63) Continuation of application No. 15/298,663, filed on Oct. 20, 2016, now Pat. No. 10,102,667, which is a
(Continued)

(51) Int. Cl.
*G06T 15/10*      (2011.01)
*G06T 15/20*      (2011.01)
(Continued)

(52) U.S. Cl.
CPC .......... *G06T 15/205* (2013.01); *G06T 15/005* (2013.01); *G06T 19/20* (2013.01);
(Continued)

(58) Field of Classification Search
CPC ......... G06T 15/20; G06T 19/00; G06T 15/10; G06T 17/00; G06F 3/04815
(Continued)

(56) References Cited

U.S. PATENT DOCUMENTS 6,477,267 B1    11/2002   Richards
7,551,770 B2     6/2009   Harman
(Continued)

FOREIGN PATENT DOCUMENTS

CN         1954606 A     4/2007
KR    2009-0123896 A   12/2009
(Continued)

OTHER PUBLICATIONS

KR Notice of Allowance dated Aug. 26, 2016 as received in Application No. 10-2014-7012338 (English Translation).
(Continued)

*Primary Examiner* — Gordon G Liu
(74) *Attorney, Agent, or Firm* — Maschoff Brennan

(57) ABSTRACT

Systems and methods are provided for rendering 3D images or video without significantly losing resolution or increasing the resolution. The systems and methods for 3D rendering technology can work with different types of 3D data frames that include left eye image and right eye image sub-frames. The 3D data frames render 3D imagery with side-by-side (SXS), top-and-bottom (TB), and frame packing (FP), as well as others such as full high definition 3D (FHD3D), frame sequential 3D, passive 3D rendering or the like. System and methods are provided for creating inverse pixel strips, and preparing 3D images that include the inverse pixel strips. Systems and methods are provided for expanding images in a plane without significant loss of resolution.

14 Claims, 20 Drawing Sheets

Related U.S. Application Data continuation of application No. 14/350,004, filed as application No. PCT/US2012/058417 on Oct. 2, 2012, now Pat. No. 9,495,791.

(60) Provisional application No. 61/543,531, filed on Oct. 5, 2011.

(51) Int. Cl.

| | | |
|---|---|---|
| *H04N 13/139* | (2018.01) | |
| *H04N 13/305* | (2018.01) | |
| *G06T 15/00* | (2011.01) | |
| *G06T 19/20* | (2011.01) | |
| *H04N 13/128* | (2018.01) | |
| *H04N 13/30* | (2018.01) | |

(52) U.S. Cl.
CPC ......... *H04N 13/139* (2018.05); *H04N 13/305* (2018.05); *G06T 2200/04* (2013.01); *G06T 2219/2016* (2013.01); *H04N 13/128* (2018.05); *H04N 13/30* (2018.05)

(58) Field of Classification Search
USPC .......................................................... 345/427
See application file for complete search history.

(56) References Cited

U.S. PATENT DOCUMENTS

| | | | |
|---|---|---|---|
| 7,573,475 | B2 | 8/2009 | Sullivan et al. |
| 8,594,180 | B2 | 11/2013 | Yang et al. |
| 9,088,777 | B2 | 7/2015 | Mengwasser |
| 9,154,762 | B2 * | 10/2015 | Lin ...................... H04N 13/106 |
| 2003/0112507 | A1 * | 6/2003 | Divelbiss ............. G02B 26/008 359/464 |
| 2005/0146521 | A1 | 7/2005 | Kaye et al. |
| 2007/0146360 | A1 | 1/2007 | Clatworthy et al. |
| 2007/0183650 | A1 | 8/2007 | Lipton et al. |
| 2007/0279412 | A1 | 12/2007 | Davidson et al. |
| 2008/0085049 | A1 | 4/2008 | Naske et al. |
| 2008/0150945 | A1 | 6/2008 | Wang et al. |
| 2008/0198920 | A1 | 8/2008 | Yang et al. |
| 2009/0116732 | A1 | 5/2009 | Zhou et al. |
| 2009/0244267 | A1 | 10/2009 | Yuan et al. |
| 2009/0284584 | A1 | 11/2009 | Wakabayashi et al. |
| 2009/0322860 | A1 | 12/2009 | Zhang et al. |
| 2010/0002678 | A1 | 2/2010 | Burazerovic |
| 2010/0007336 | A1 | 3/2010 | Jung et al. |
| 2010/0073364 | A1 | 3/2010 | Jung et al. |
| 2010/0225741 | A1 | 9/2010 | Hong et al. |
| 2010/0026619 | A1 | 10/2010 | Kim et al. |
| 2010/0266198 | A1 | 10/2010 | Kim et al. |
| 2010/0309286 | A1 | 12/2010 | Chen et al. |
| 2011/0026809 | A1 | 2/2011 | Jeong et al. |
| 2011/0032340 | A1 | 2/2011 | Redmann et al. |
| 2011/0043540 | A1 | 2/2011 | Francher |
| 2011/0069152 | A1 | 3/2011 | Wang et al. |
| 2011/0157305 | A1 | 6/2011 | Kosakai et al. |
| 2011/0234760 | A1 | 9/2011 | Yang et al. |
| 2013/0093844 | A1 * | 4/2013 | Shuto .................. G06F 3/04815 348/43 |

FOREIGN PATENT DOCUMENTS

| | | |
|---|---|---|
| WO | 2004/100562 A1 | 11/2004 |
| WO | 2005/114998 A1 | 12/2005 |
| WO | 2007/116549 A1 | 10/2007 |
| WO | 2010/041896 A2 | 4/2010 |

OTHER PUBLICATIONS

KR Office Action dated Feb. 24, 2016 as received in Application No. 10-2014-7012338 (English Translation).

AU Office Action dated Mar. 25, 2015 as received in Application No. 2012318854.

Extended European Search Report dated Apr. 8, 2015 as received in Application No. 12838530.9.

"An Edge-Guided Image Interpolation Algorithm via Directional Filtering and Data Fusion" (IEEE Transactions On Image Processing, vol. 15, No. 8, Aug. 2006, by Lei Zhang, Membber, IEEE, and Xiaolin Wu, Senior Member, IEEE).

* cited by examiner

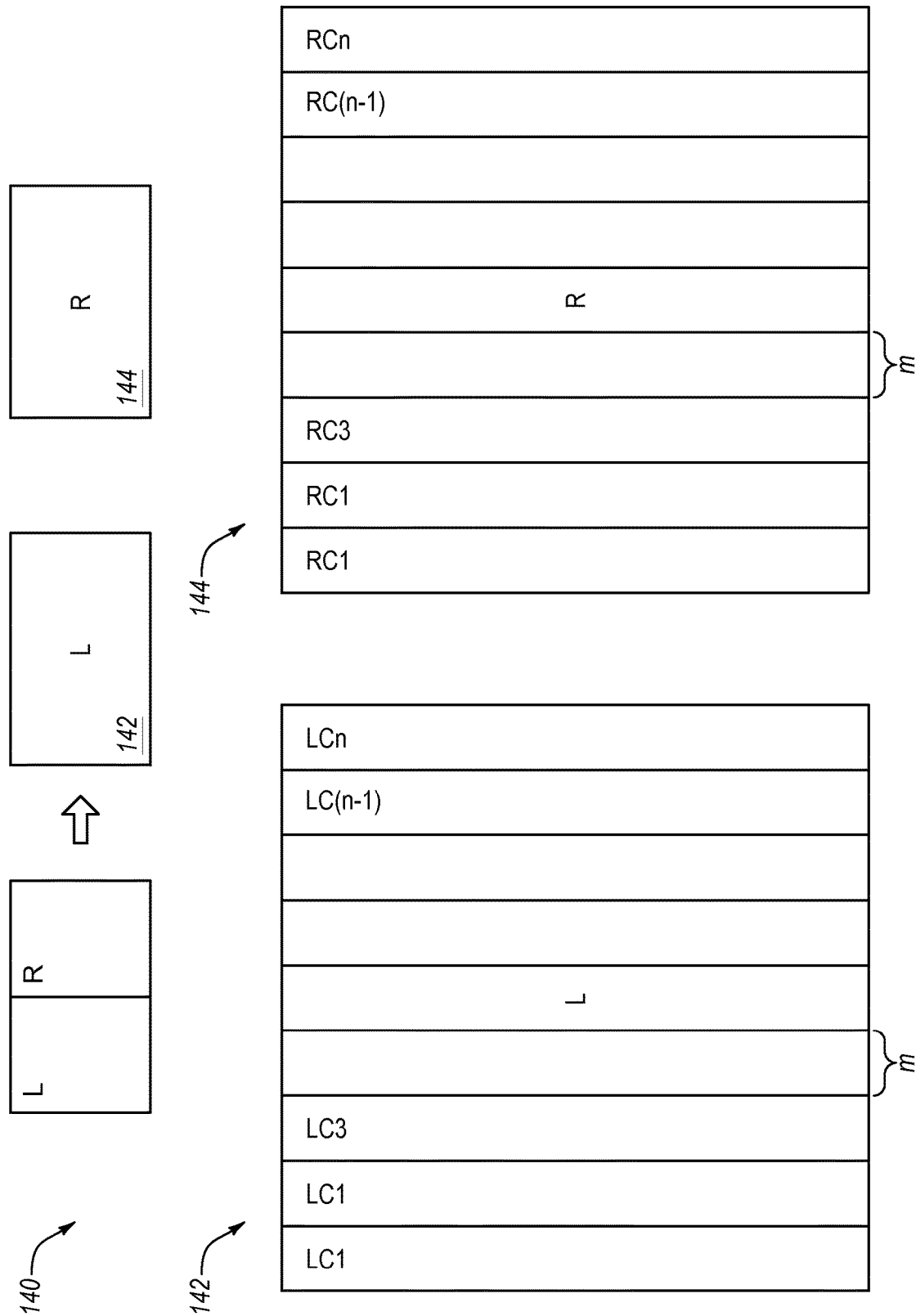

| | Odd | Even |
|---|---|---|
| Left Eye | LC(n-1)/RCn' | LC(n-1)/RCn' |
| Right Eye | RC(n-1)/LC(n-2)' | RC(n-1)/LC(n-2)' |
| | | |
| | | |
| Right Eye | RC5/LC4'... | RC6/LC5'... |
| Left Eye | LC3/RC4' | LC4/RC5' |
| Right Eye | RC3/LC2' | RC4/LC3' |
| Left Eye | LC1/RC2' | LC2/RC3' |
| Right Eye | RC1 | RC2 |

| | Odd | Even |
|---|---|---|
| Right Eye | RC(n-1)/LCn' | RC(n-1)/LCn' |
| Left Eye | LC(n-1)/RC(n-2)' | LC(n-1)/RC(n-2)' |
| | | |
| | | |
| Left Eye | LC5/RC4'... | LC6/RC5'... |
| Right Eye | RC3/LC4' | RC4/LC5' |
| Left Eye | LC3/RC2' | LC4/RC3' |
| Right Eye | RC1/LC2' | RC2/LC3' |
| Left Eye | LC1 | LC2 |

*Fig. 15*

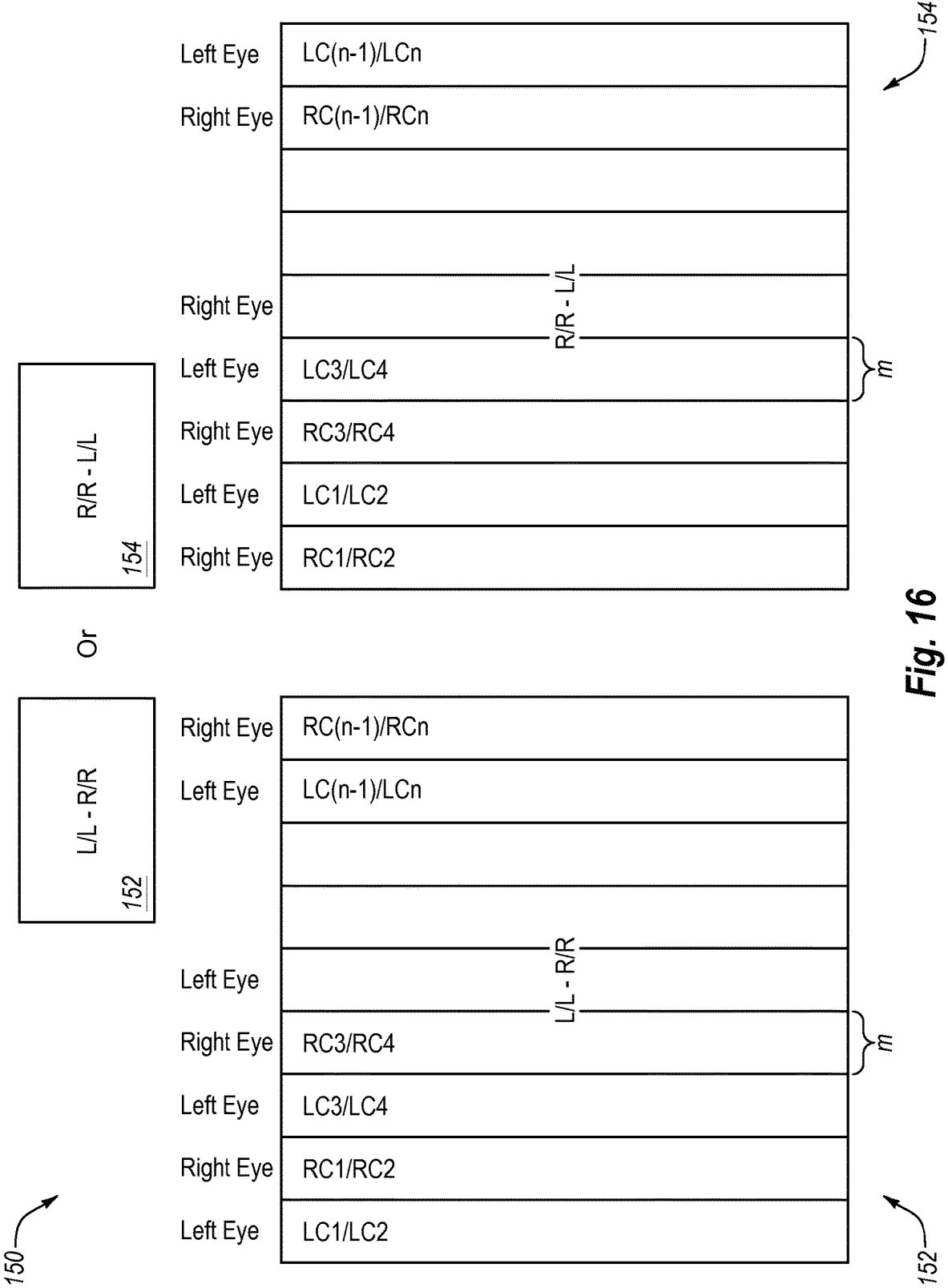

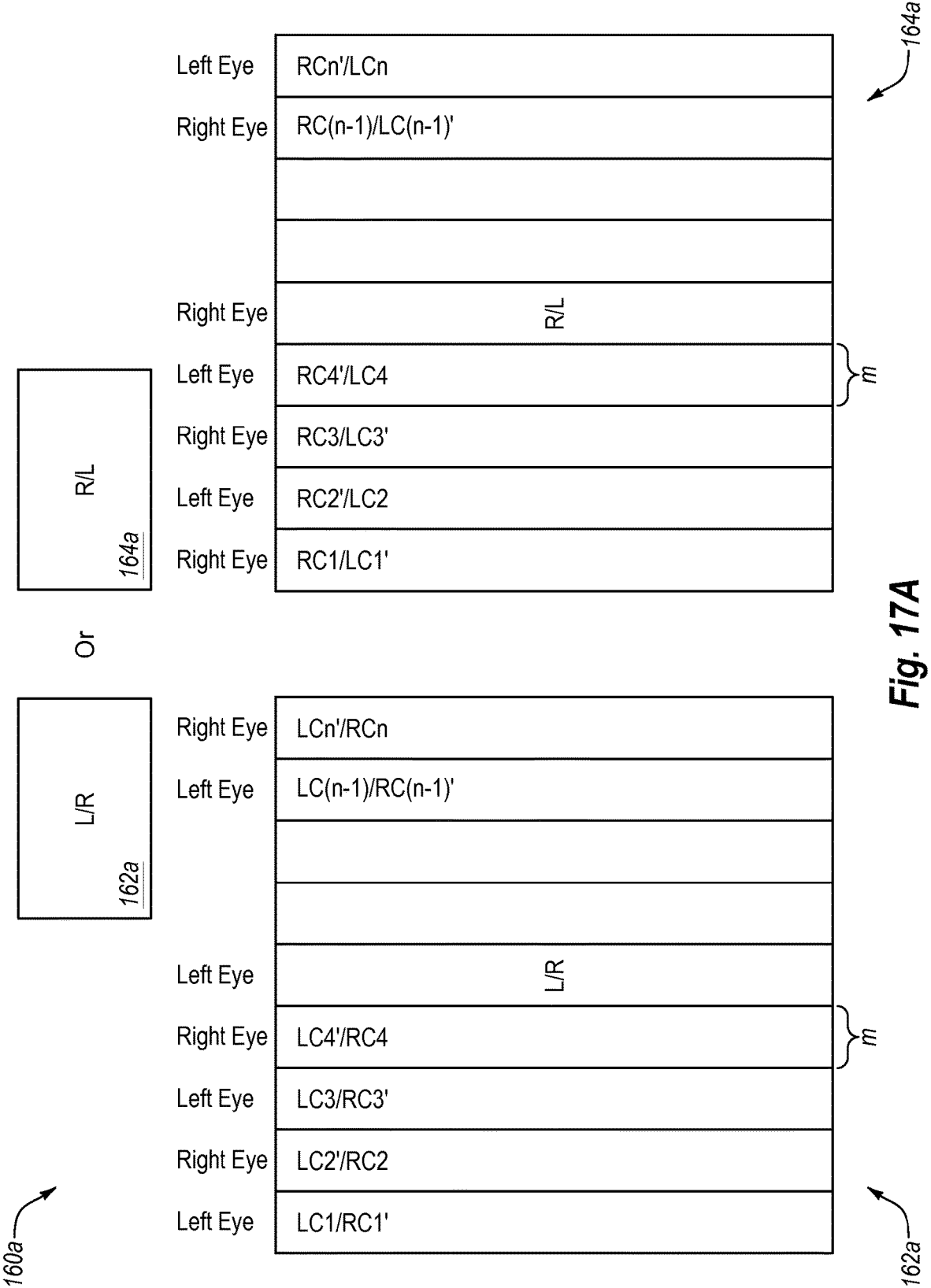

RESOLUTION ENHANCED 3D RENDERING SYSTEMS AND METHODS

CROSS-REFERENCE TO RELATED APPLICATIONS

The present patent application claims benefit of provisional U.S. Patent Application No. 61/543,531, filed Oct. 5, 2011, which provisional patent application is incorporated herein by specific reference in its entirety.

BACKGROUND

The advancements in video technology have resulted in home televisions being configured for displaying three-dimensional (3D) video. However, it has been found that the display of 3D video on televisions may not provide full resolution due to problems in the video processing and algorithms for generating images that show 3D imagery to a viewer. As such, there remains a need in the art to improve processing of images and video in order to show high quality 3D imagery to a television viewer.

Additional information on 3D imagery can be found in the following references: 2011/0069152; 2011/0043540; 2010/0309286; 2010/0026784; 2010/0266198; 2010/0225741; 2010/0073364; 2009/0116732; 2009/0322860; 2009/0244267; 2008/0198920; 2008/0150945; 2008/0085049; 2007/0279412; 2007/0146360; 2005/0146521; U.S. Pat. Nos. 7,7573,475; 7,551,770; and 6,477,267, which references are incorporated herein by specific reference in their entirety.

BRIEF DESCRIPTION OF THE FIGURES

FIG. 14 includes a schematic representation of a method for vertically parsing a left eye sub-frame and a right eye sub-frame into pixel columns;

FIG. 15 includes a method of preparing different versions of 3D images using pixel columns and superimposed pixel columns prepared from pixel columns and inverted pixel columns;

FIG. 16 includes a splicing method to splice superimposed pixels columns into a single full frame;

FIG. 17A includes a splicing method to splice superimposed pixels columns into a single full frame.

DETAILED DESCRIPTION

Generally, the present invention provides systems and methods for rendering 3D images or video without significantly losing resolution or increasing the resolution. The systems and methods for 3D rendering technology can work with different types of 3D data frames that include left eye image and right eye image sub-frames. The 3D data frames render 3D imagery with side-by-side (SXS), top-and-bottom (TB), and frame packing (FP), as well as others such as full high definition 3D (FHD3D), frame sequential 3D, passive 3D rendering or the like. One of ordinary skill in the art can apply the present invention of generating expanded images, inverted pixel strips, inverted pixel images, and rendering 3D images to any of the 3D rendering formats recited herein or later developed. The present invention can avoid warping 3D techniques.

The present invention can take the left eye sub-frame and right eye sub-frame and create a 3D image frame that retains significant resolution or improves the resolution, and in many cases has substantially no resolution loss. In other cases, the systems and methods re-resolve the images so that each 3D image displayed has substantially full resolution of the original image before being parsed into left eye image and right eye image sub-frames. Not only can the present invention provide high definition 3D rendering for active and passive 3D technologies without significant resolution loss, the technology can recreate through weighted estimation any lost resolution. If left and right eye sub-frames are provided that have lost resolution, the present invention can increase the resolution, and in some instance provide a 3D image that appears to have full resolution.

Figure 1:
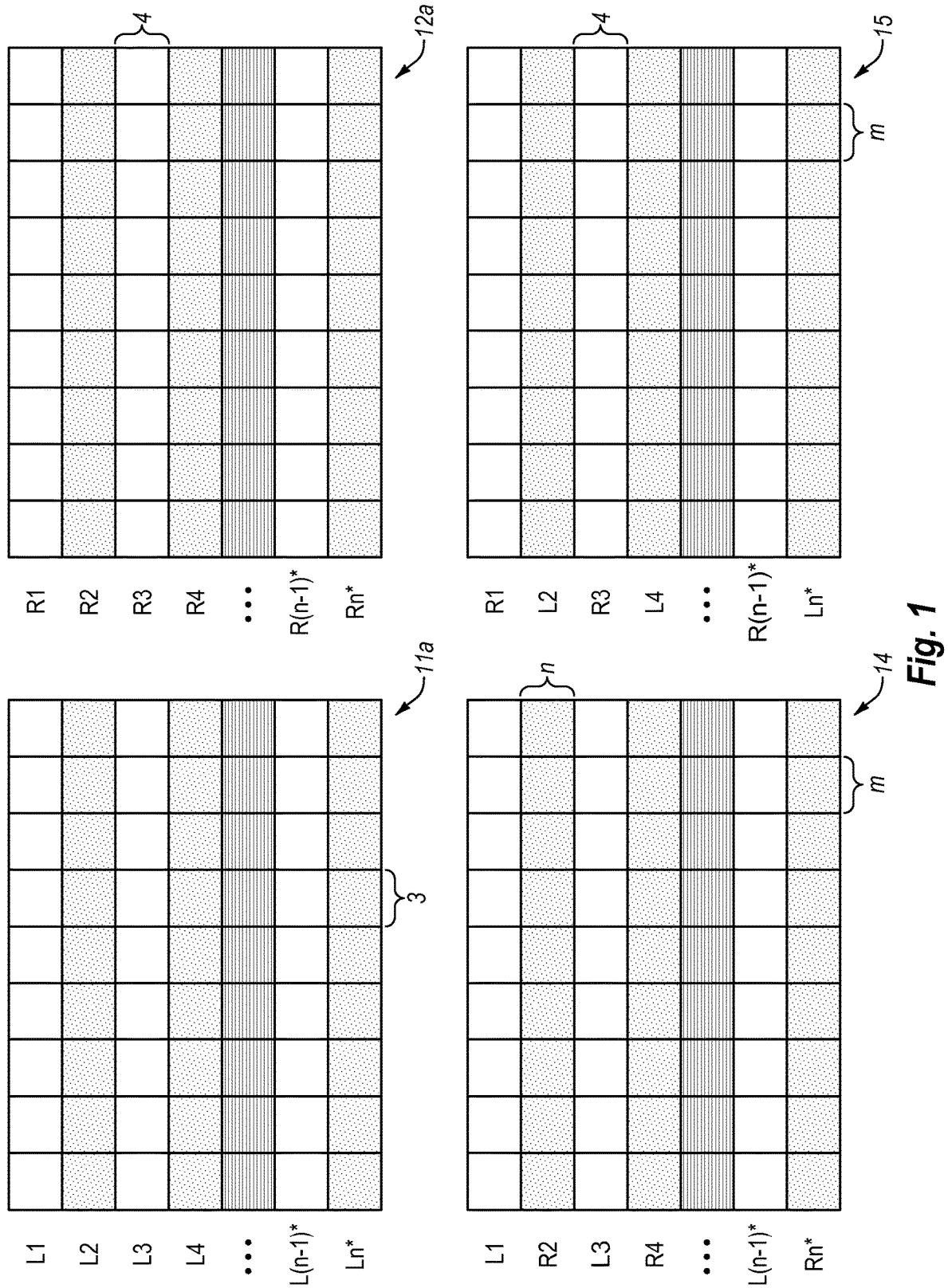
FIG. 1 includes a schematic representation of a splicing process that splices pixel rows from sub-frame 11a and pixel rows from sub-frame 12a into a single full size image 14, 15.

FIG. 1 shows a 3D rendering technique that can operate with displays that use passive 3D glasses technologies, such as the side-by-side protocol described above and the top-and-bottom protocol described below. In order to obtain an image that is viewable as a 3D image, the left sub-frame 11 and right sub-frame 12 are expanded to full size as shown in full sub-frames 11a (left full sub-frame 11a) and 12a (right full sub-frame 12a). The full size sub-frame images 11a, 12a are then parsed into pixel rows L1-Ln for the left image 11a and R1-Rn for the right image 12a. Every other pixel row of the images 11a, 12a are then spliced together to get a full image 14, 15; however, the full image, 14, 15 inherently loses 50% of its resolution due to the splicing technique. This splicing technique renders 3D imagery when used with passive 3D glasses, such as polarized 3D glasses. Only one of full image 14 or image 15 is displayed so only one needs to be generated. As shown in FIG. 1, the pixel rows are designated as an "L" pixel row or an "R" pixel row. The L pixel rows are rows that are designated to be seen with the left eye and the R rows are rows that are designated to be seen with the right eye when the 3D image is rendered.

The expansion technique has been performed to expand the sub-frames 11, 12 on the horizontal plane by separating the pixel columns 3 and inserting a new pixel columns 3 between the two original pixel columns that were separated. Previously, each new pixel can be a duplicate of one of the adjacent pixels of the pixel columns, and thereby each new pixel can be the same as the left adjacent pixel or right adjacent pixel of the original pixel columns that are separated, where consistent use of either the adjacent left or right pixel is used for the new pixel. As such, the expansion of the sub-frames in the horizontal plane inherently causes a 50% loss in resolution when merely using an adjacent pixel for the value of a new pixel. The expanded sub-frames become left eye sub-frame 11a and right eye sub-frame 12a, where the left eye pixel rows are all in the left sub-frame 11a and the right eye pixel rows are all in the right sub-frame 12a.

After the images of the left sub-frame 11 and right sub-frame 12 have been expanded in the horizontal plane, the left and right sub-frames 11a, 12a are then spliced together. That is, left eye pixel rows are combined with right eye pixel rows in an alternating pattern for a first sub-frame 14 with the top row being a left eye pixel row and a second sub-frame 15 with the top row being a right eye pixel row.

However, prior to splicing, each of the full size sub-frames 11a, 12a are parsed into horizontal pixel rows 4 having a pixel width of n in the vertical plane, where n can be any integer, with examples of n ranging from 1 to 25% of the total number of vertical pixels. The parsing of the full size sub-frames 11a, 12a is described in more detail herein with respect to FIG. 2. In any event, the parsing of the left sub-frame 11a results in pixel rows of L1, L2, L3, and so on up to L(n−1), and Ln that are intended to be viewed with the left eye during 3D rendering. Similarly, the parsing of the right sub-frame 12a results in pixel rows of R1, R2, R3, and so on up to R(n−1), and Rn that are intended to be viewed with the right eye during 3D rendering. These L-specific and R-specific pixel rows 4 are then spliced together to provide a single image frame 14 or 15 from the two sub-frames 11a, 12a. As shown, a single image full frame 14 can include the pixel rows in sequence: L1 (for left eye), R2 (for right eye), L3 (for left eye), R4 for right eye), and so on up to L(n−1) (for left eye), and Rn (for right eye). This single image full frame 14 can be displayed on an appropriately configured display screen that uses passive technology to render the 3D imagery. The passive technology can use passive polarized glasses or glassless 3D technologies. For example, the L-specific pixel rows 4 can have one polarization, and the R-specific pixel rows 4 can have the opposite polarization so that the left eye only sees left eye pixel rows and the right eye only sees right eye pixel rows. The differentiation of left eye pixel rows and right eye pixel rows being seen by the appropriate eye allows for the brain to see the rendered 3D image. As such, each eye only is able to view 50% of the available pixels, which results in a loss of resolution.

Another embodiment of a single image full frame 15 can include the pixel rows in sequence: R1 (for right eye), L2 (for left eye), R3 (for right eye), L4 (for left eye), and so on up to R(n−1) (for right eye), and Ln (for left eye). This single image full frame 15 is also displayed on an appropriate display so that with polarization, each eye only views 50% of the available pixels of each frame 15. However, it should be noted that depending on the total number of vertical pixels, the bottom two pixel rows for frame 14 could be R(n−1) and Ln and for frame 15 could be L(n−1) and Rn, which can be applied to all frames and sub-frames described herein. An even number of pixel rows will provide the last two pixel rows as found in FIG. 1; however, odd numbers of pixel rows with invert the bottom two pixel rows. The ellipses between R4 and L(n−1) for frame 14 and between L4 and R(n−1) for frame 15 are meant to indicate that any number of pixel rows 4 can be located therebetween. Images 14, 15 are representative of the format for FPR televisions. Also, it should be noted that passive 3D viewing would display only one of frame 14 or 15. As such, either frame 14 or 15 can be produced, and there is no need for preparing both frames.

Also, 3D technologies for passive or polarized glass as described in FIG. 1 can be applied to the TB protocol. That is, the top sub-frame 21 that is left eye specific and bottom sub-frame that is right eye specific can be expanded in the vertical plane similar to the process described above for expansion in the horizontal plane. Briefly, expansion in the vertical plane is performed by separating adjacent pixel rows and introducing a new pixel row between the two original pixel rows that were vertically separated. Each new pixel is a duplicate of one of the adjacent pixels of the pixel rows. Each new pixel can be the same as the top adjacent pixel or bottom adjacent pixel of the original pixel rows that are separated, where consistent use of either the adjacent top or bottom pixel is used for the new pixel. As such, the expansion of the sub-frames in the vertical plane can cause a 50% loss in resolution when merely using an adjacent pixel for the value of a new pixel. However, the resolution improving techniques described herein (FIGS. 3-4) that estimate the value of the new pixels of the new pixel rows 4 can be used to provide nearly full resolution sub-frames 21a, 22a. The resulting full size left sub-frame 21a and right sub-frames 22a are then parsed and spliced as described in connection to FIG. 1.

Figure 2:
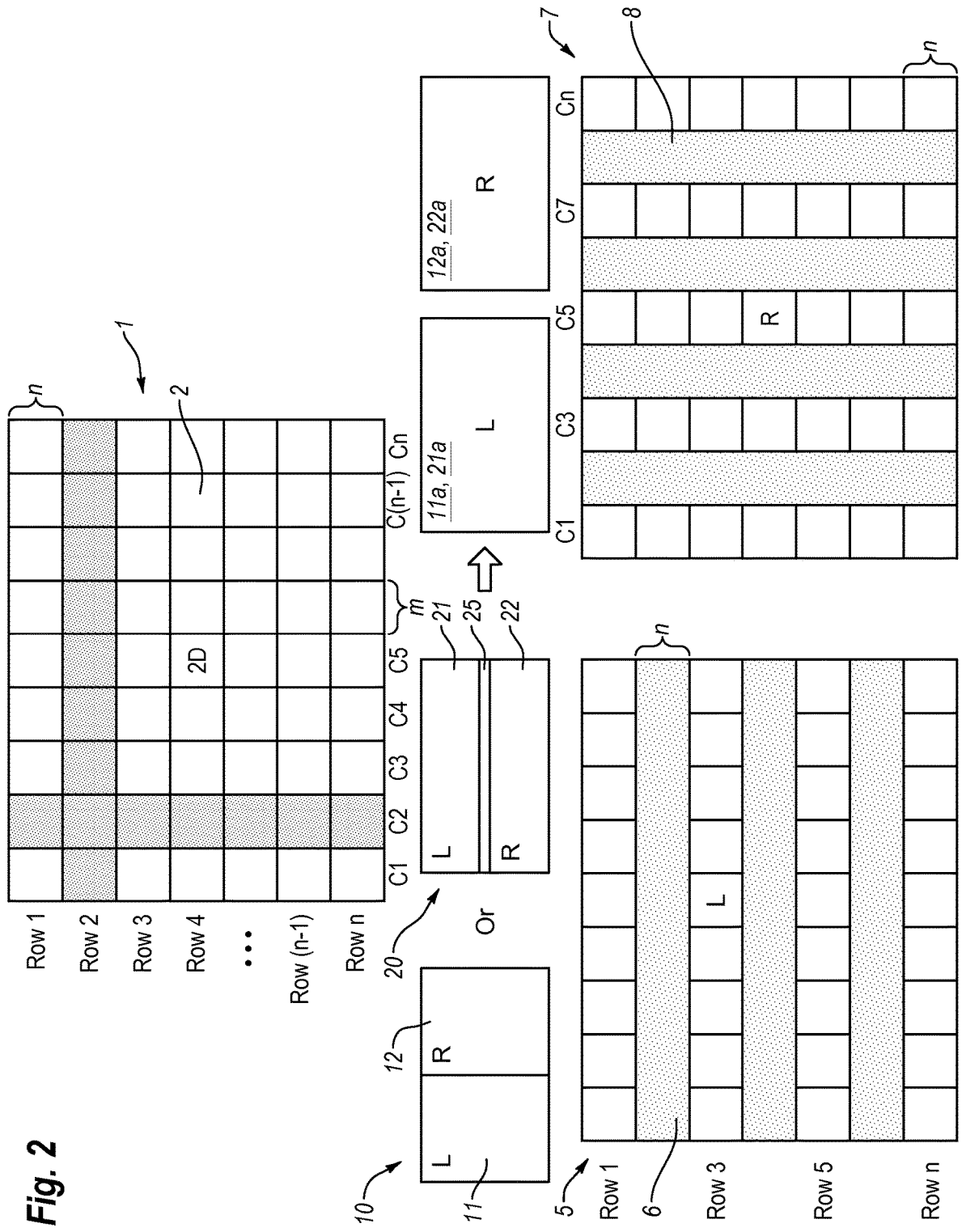
FIG. 2 includes a schematic representation of a technique for reducing the size of an original image 1 in the horizontal or vertical planes in order to produce a vertically shortened image 5 having removed pixel rows 6 or a horizontally shortened image 7 having removed pixel columns 8 for use as sub-frames for 3D rendering.

FIG. 2 shows the original image 1, which has pixels 2 in pixel rows Row 1, Row 2, Row 3, Row 4, Row (n−1), and Row n (however additional rows are likely for a full resolution image, such as between Row 4 and Row (n−1)) and in pixel columns Column 1, Column 2, Column 3, Column 4, Column 5, Column (n−1) (i.e., C(n−1)), and Column n (i.e., Cn). The number of pixel rows 4 and/or pixel columns 3 is for illustration only, and the number of pixel rows 4 and pixel columns 3 would be commensurate with the resolution of the original image 1. Here, the pixel rows 4 can be one or more pixels 2 thick, where n can be any integer, such as 1, 2, 3, 4, 5, 6, 7, 8, 9, 10, or more up to 25% of the full resolution pixel number for the vertical pixels 2. Also, the pixel columns 3 can be one or more pixels 2 thick, where m can be any integer, such as 1, 2, 3, 4, 5, 6, 7, 8, 9, 10, or more up to 25% of the full resolution pixel number for the horizontal pixels 2. As shown in the original image 1 is that when transformed to a SXS sub-panel 11, 12, about 50% of the pixel columns 3 are removed or deleted. Also shown is that when transformed to a TB sub-panel 21, 22, about 50% of the original image 1 pixel rows 4 are removed or deleted. The removed or deleted pixel rows 4 or pixel columns 3 are shown with dark stipple, as exemplified by Row 2 and C2 (e.g., Column 2) being removed or deleted. Some pixel columns 3 have to be removed in order to obtain the sub-frames 11, 12 so that the combined left sub-frame 11 and right sub-frame 12 have the full resolution of pixels 2. Also, some pixel rows 4 have to be removed in order to obtain the sub-frames 21, 22 so that the combined left sub-frame 21 (Top) and right sub-frame 22 (Bottom) have the full resolution of pixels 2 optionally with the pixel buffer 25 located therebetween. No pixel rows or columns need to be removed for FP or other FHD3D protocols.

In order to create the 3D effect for the original image 1, the sub-frames in SXS and TB protocols are expanded to the full resolution of pixels 2 for the original image 1 if necessary; however, when the sub-frames are expanded the data for the removed or deleted pixel columns 3 or pixel rows 4 may not be available. As such, the horizontal plane expansion has to insert new pixel columns 3 between the pixel columns 3 that were retained in the sub-frames 11, 12, and vertical plane expansion has to insert new pixel rows 4 between the pixel rows 4 that were retained in the sub-frames 21, 22. Pixel columns 3 and pixel rows 4 are illustrated in FIG. 1.

Image 5 of FIG. 2 includes a representation of a vertically expanded image 21a or 22a that can be used for the TB protocol, which image 5 is obtained from vertical expansion of either the left sub-panel 21 or the right sub-panel 22. Here, image 5 represents left sub-panel 21a after vertical expansion to left eye image 21a; however, the same expansion protocol is used for vertically expanded image 22a from the right sub-panel 22. As shown, new pixel rows 6 are located between the retained pixel rows, where new pixel rows 6 are located between Row 1 and Row 3, between Row 3 and Row 5, and between Row 5 and Row n. The new pixel rows 6 are shown with light stipple and include a number of pixels 2 (see FIG. 2).

Image 7 of FIG. 2 includes a representation of a horizontally expanded image 11a or 12a that can be used for the SXS protocol, which image 7 is obtained from horizontal expansion of either the left sub-panel 11 or the right sub-panel 12. Here, image 7 represents right sub-panel 12 after horizontal expansion to right eye image 12a; however, the same expansion protocol is used for horizontally expanded image 11a for the left sub-panel 11. As shown, new pixel columns 8 (stippled) are located between the retained pixel columns (no stipple), where new pixel columns 8 are located between C1 and C3, between C3 and C5, between C5 and C7, and between C5 and Cn. The new pixel columns 8 are shown with light stipple and include a number of pixels 2 (see FIG. 3).

Figure 4:
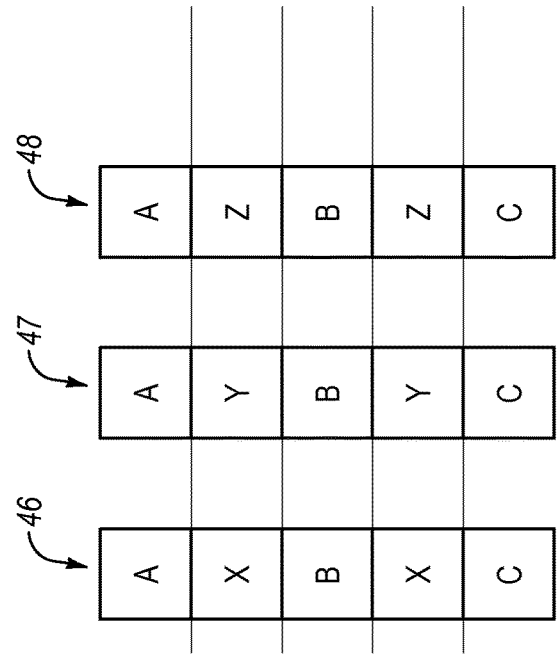
FIG. 4 illustrates sub-frame vertical plane resizing techniques to expand a reduced size sub-frame to obtain a full sized frame for 3D rendering by separating vertically-adjacent pixels A, B and placing a new pixel X, Y, or Z between pixels A and B.
Figure 3:
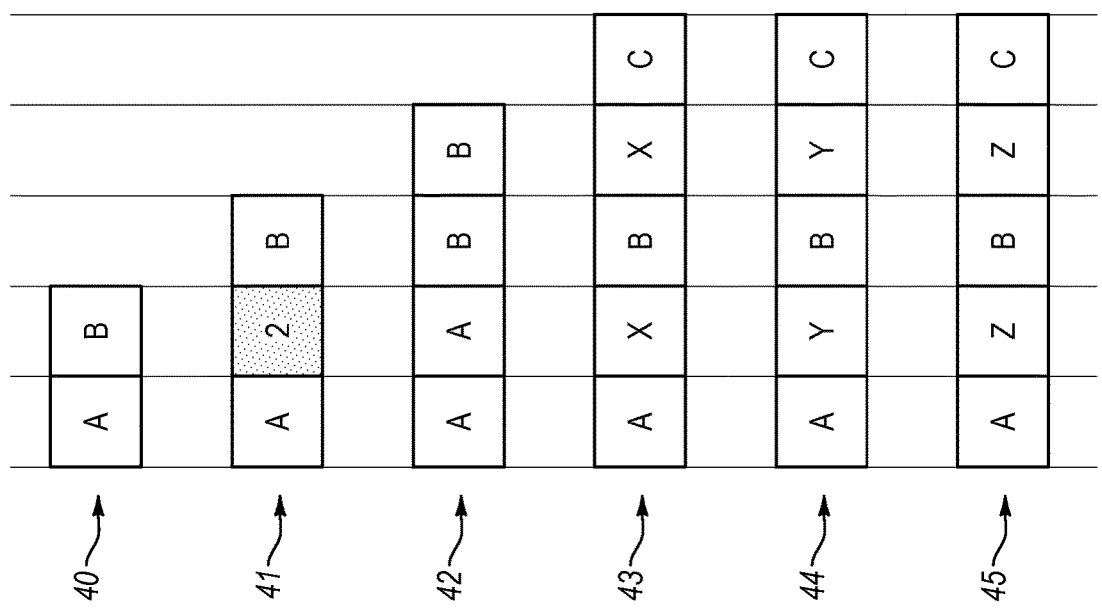
FIG. 3 illustrates sub-frame horizontal plane resizing techniques to expand a reduced size sub-frame to obtain a full sized frame for 3D rendering by separating horizontally-adjacent pixels A, B and placing a new pixel 2, X, Y, or Z between pixels A and B.

FIG. 3 shows pixels 2 that represent the pixels of the new pixel columns 8 (see image 7 of FIG. 2). FIG. 4 similarly shows pixels 2 that represent the pixels of the new pixel rows 6 (see image 5 of FIG. 2). Here, pixel row 40 shows that pixels A and B are adjacent, such as when in either sub-frame 11 or sub-frame 12. Pixel row 41 shows that a new pixel 2 is located between pixel A and pixel B. If the data of the original pixel 2 from the original image 1 is available, the data can be used to recreate original pixel 2 so that the image 7 is exactly the same as the original image 1. However, due to data requirements, the data of the removed or deleted pixels is likely lost, and thereby the data for new pixel 2 must be determined.

In the prior art, the method of determining the data for the new pixel 2 has been merely to use the data from an adjacent pixel, such as pixel A, which is shown in pixel row 42. However, it should be recognized that new pixel 2 may also be a duplicate of pixel B in the prior techniques. The mere duplication of the adjacent pixel A or B does not provide improved resolution and does not correct for the resolution that is lost when creating the sub-frames 11a, 12a.

An improved method of determining data for the new pixel 2 can include averaging the data of pixel A and pixel B so that the new pixel X is an average of its adjacent pixels as shown in pixel row 43. The data for pixel X can be obtained by $X=(A+B)/2$. However, the data for new pixel X is not the same as original pixel 2. Also, merely averaging the data for adjacent pixels A and B may not significantly help in obtaining expanded images for being combined into a 3D image. While X is useful, there are other ways to more accurately estimate the data of the new pixel 2. Thus, the value of the new pixel 2 can be something other than just an average of the adjacent pixels in order to improve or restore resolution. This same method can be performed for vertical expansion from sub-frames 21, 22 to image 5, which is shown in new pixel column 46.

A method of the present invention shown in pixel row 44 can be used to provide data for the new pixel 2 that is more suitable for the later rendering of the 3D image from the expanded images 5, 7. This method uses the average value of pixel X in determining a new value for pixel Y by $Y=(A+X)/2$ so that the data for pixel Y matches more closely to the data for pixel A or $Y=(X+B)/2$ so that the data for pixel Y matches more closely to the data for pixel B. All of the new pixels in the expanded image 5, 7 can be a pixel Y that matches the adjacent left pixel A or the adjacent right pixel B, which is the directional orientation of a viewer of the image and pixels. This protocol provides improved data for expansion of the sub-frame images. This same method can be performed for vertical expansion from sub-frames 21, 22 to image 5, which is shown in new pixel column 47.

Another method of determining the data for new pixel 2 during image expansion can be found in pixel row 45. Here, the new pixel 2 has the data of pixel Z. Pixel Z can be obtained from $Z=(Y+X+A)/3$ or $Z=(Y+X+B)/3$ depending on if matching the adjacent left pixel A or the adjacent right pixel B or vice versa. Alternatively, Z can be $Z=(X+Y)/2$.

The methodologies of FIGS. 3-4 can be implemented by a computing system, such as a television, video source, 3D rendering device, or like computing component that can generate, render, or show 3D images and video. Accordingly, the methodologies can be implemented as computer program products that are stored on a memory device with computer executable instructions that cause the computer to execute certain functions as described. In one embodiment, the computing method can include a method for creating pixel content, such as: providing two adjacent pixels; separating the two adjacent pixels; inserting a new pixel between the two adjacent pixels; and creating new pixel data for the new pixel from pixel data of both the two adjacent pixels, wherein the new pixel data is weighted to include more pixel data from one of the two adjacent pixels and less pixel data from the other of the two adjacent pixels. The method can also include one or more of the following: defining the two adjacent pixels as Pixel A and Pixel B, wherein Pixel A has data A and Pixel B has data B; calculating data X, wherein data X=(data A+data B)/2; calculating data Y, wherein data Y=(data A+data X)/2; using data Y as the new pixel data; calculating data Y, wherein data Y=(data B+data X)/2; or using data X as the new pixel data. In one aspect, the two adjacent pixels are in a pixel row with the new pixel after creation of the new pixel, or the two adjacent pixels are in a pixel column with the new pixel after creation of the new pixel. The computing method can include creating a new pixel strip between a first pixel strip and a second pixel strip, wherein the new pixel strip includes a plurality of new pixels, each new pixel includes new pixel data that is weighted to include more pixel data from one of the two adjacent pixels and less pixel data from the other of the two adjacent pixels of the first and second pixel strips. The computing method can include preparing a full-frame image having about twice as many pixels as a sub-frame image having the two adjacent pixels being adjacent, wherein the full-frame image includes new pixels between each of the two adjacent pixels of the sub-frame image.

In one embodiment, the computing method can include: providing two adjacent pixel strips; separating the two adjacent pixel strips; inserting a new pixel strip between the two adjacent pixel strips; and creating new pixel data for each new pixel of the new pixel strip from pixel data of both pixels adjacent to the new pixels, wherein the new pixel data of each new pixel is weighted to include more pixel data from one of the two adjacent pixels to the new pixel and less pixel data from the other of the two adjacent pixels to the new pixel.

In one embodiment, the present invention includes a method for expanding a pixel image in a plane. Such a method can include performing any of the methods of pixel content for a plurality of pixels in a pixel strip, where the generated pixel strip expands the image in a plane. Generated pixel strip rows expand the image in the vertical direction (e.g., expanding the pixel image in a Y-axis plane) while generated pixel strip columns expand the image in the horizontal direction (e.g., expanding the pixel image in an X-axis plane). Image expansion methods can include preparing a full-frame image from a sub-frame image, wherein the full frame image has about twice the pixel strips of the sub-frame image. Then, the method can include preparing a 3D image from the full-frame image. The full-frame image can be configured for viewing with the right eye or left eye, or a full-frame image can be generated for each eye. The full-frame image can have left eye pixel strips configured for viewing with the left eye and right eye pixel strips configured for viewing with the right eye, where the left eye pixel strips can alternate with the right eye pixel strips. The left eye pixel strips can be left eye pixel rows and the right eye pixel strips can be right eye pixel rows. Alternatively, the left eye pixel strips can be left eye pixel columns and the right eye pixel strips are right eye pixel columns. The method can include rendering a 3D image having two previously adjacent pixels with the new pixel therebetween. Also, the 3D image can have one or more inverted pixel strips with inverted data compared to adjacent pixel strips. Thus, the 3D image can have one or more pixel strips with inverted pixel data.

In one embodiment, a computing method can be implemented for expanding a pixel image in a plane, such as: providing a sub-frame image that has a reduced pixel strip count in at least one plane compared to a full-frame image of the sub-frame image that has a full pixel strip count in both planes, wherein the reduced pixel strip count is about 50% of the full pixel strip count; and preparing a new full-figure image of the sub-frame image by performing a pixel generation or image expansion protocol. The image expansion protocol can include: providing a sub-frame image that has a reduced pixel strip count in at least one plane compared to a full-frame image of the sub-frame image that has a full pixel strip count in both planes, wherein the reduced pixel strip count is about 50% of the full pixel strip count; defining pixel strips of the sub-frame image, which sub-frame image has at least two adjacent pixel strips, pixel strip A having pixels A and pixel strip B having pixels B; separating pixel strip A from pixel strip B so that pixels A are separated from pixels B; inserting a new pixel strip between pixel strip A and pixel strip B, the new pixel strip having new pixels corresponding to pixels A and pixels B; and creating new pixel data for the new pixel from pixel data of both pixels A and pixels B, wherein the new pixel data is weighted to include more pixel data from pixels A and less pixel data from pixels B. This can include the computing system performing one or more of: defining in the sub-frame image two adjacent pixels as Pixel A from pixel strip A and Pixel B from pixel strip B, wherein Pixel A has data A and Pixel B has data B; calculating data X, wherein data X=(data A+data B)/2; calculating data Y, wherein data Y=(data A+data X)/2; using data Y as the new pixel data; calculating data Y, wherein data Y=(data B+data X)/2; or using data X as the new pixel data. The computing method for image expansion can include one or more of: preparing a full-frame image having about twice as many pixels as the sub-frame image; expanding the sub-frame pixel image in a Y-axis plane; or expanding the sub-frame pixel image in an X-axis plane; preparing a 3D image from the full-frame image, wherein the full-frame image is configured for viewing with the right eye or left eye, or wherein the full-frame image has left eye pixel strips configured for viewing with the left eye and right eye pixel strips configured for viewing with the right eye, or wherein the left eye pixel strips alternate with the right eye pixel strips, or wherein the left eye pixel strips are left eye pixel rows and the right eye pixel strips are right eye pixel rows, or wherein the left eye pixel strips are left eye pixel columns and the right eye pixel strips are right eye pixel columns.

Figure 5:
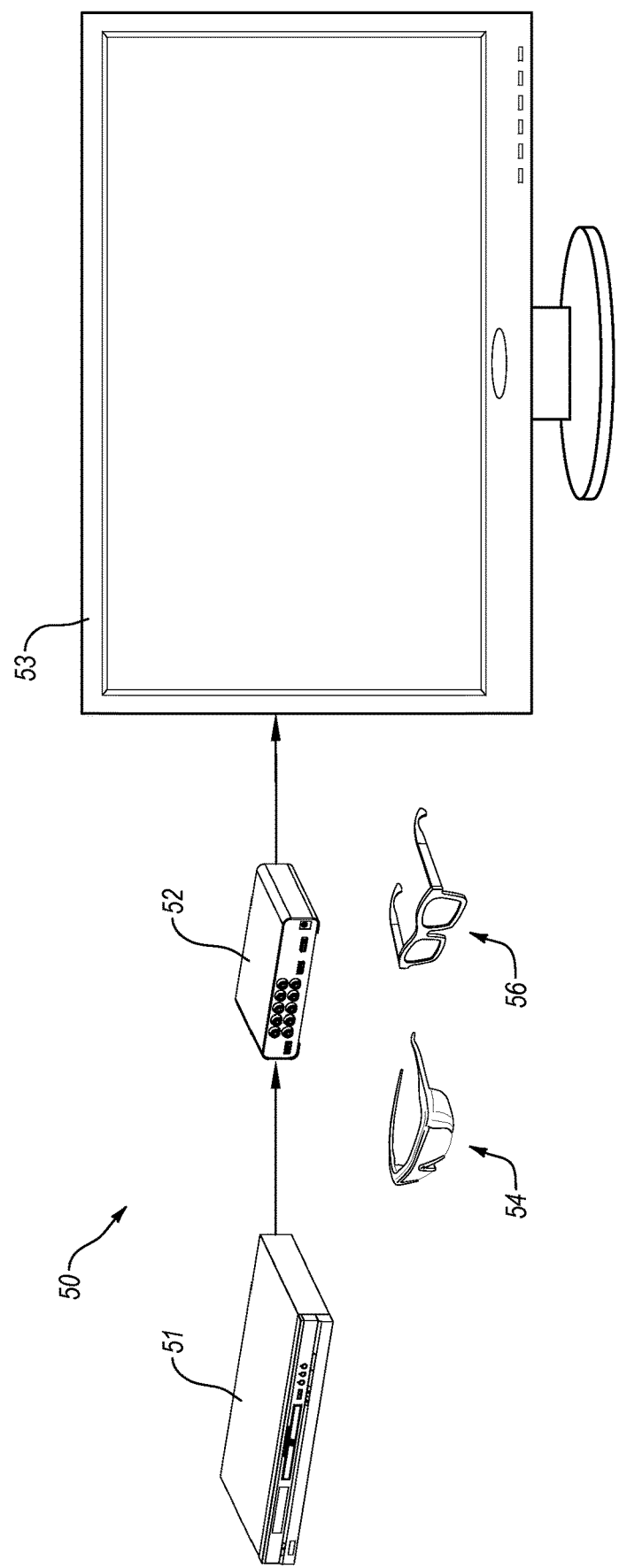
FIG. 5 includes an operating environment 50 that includes a video source 51, 2D to 3D converter 52, and a television 53 capable of displaying 3D images, where active 3D glasses 54 and passive 3D glasses 56 are also shown.

The 3D rendering technology of the present invention can work in various operating environments. For example, FIG. 5 provides an operating environment 50 that includes a video source 51, 3D rendering device 52, and a television 53 capable of displaying the rendered 3D images. Here, a dedicated 3D rendering device 52 performs the 3D rendering protocol in accordance with SXS, TB, FP, or any other 3D rendering protocol. This operating environment 50 may include either active 3D glasses 54 or passive 3D glasses 56. In another example, an internal 3D rendering module can be in the video source 51 and/or television 53, which negates the requirement for a separate device. The video source 51 can be any type of video source that provides the video in various formats for 3D rendering. In one example, the video source 51 provides the video as a pure 2D video that does not include any left eye specific image sub-frames or any right eye specific image sub-frames. The 3D rendering device or module can also be configured for 2D to 3D conversion using the 3D rendering technology. In yet another example, the video source 51 can provide video data that includes left eye specific image sub-frames and corresponding right eye specific image sub-frames.

As such, the present invention can operate with either a pure 2D video as video data input as well as 3D data input that includes left eye specific image sub-frames and corresponding right eye specific image sub-frames. In either case, any 2D to 3D converter technology can provide 3D image data having separate left eye sub-frames and right eye sub-frames that provide a 3D image without significant loss of resolution or without any loss of resolution. In some instances, any lost resolution from the creation of left eye specific image sub-frames and corresponding right eye specific image sub-frames can be reconstructed through the 3D rendering technology so that the resolution loss is minimized or so significantly reduced that the 3D image appears to have full resolution.

The present invention can provide high definition images and video from any of the various 3D video technologies that use two different images that each contains content that is eye specific: a left eye specific image sub-frame and a right eye specific image sub-frame. The current technologies of SXS, TB, and FP each function by using eye specific images in the sub-frames, and these eye specific sub-frames can be processed with the present invention to obtain 3D images without resolution degradation. One aspect of the current invention can also provide the eye specific images to use as the left eye sub-frame and the right eye sub-frame. In any event, two eye-specific sub-frames are processed through the systems and methods described herein in order to provide a single 3D image that can be displayed and viewed as a 3D image to the observer.

The generation of a 3D image can use two eye specific sub-frames, which can be configured in accordance to the various 3D conversion protocols. On the other hand, the eye specific images can be generated by parsing an image into strips and re-assembling or splicing the strips in either a SXS or TB format which has 50% degradation of resolution in either the horizontal or vertical planes. However, the splicing technique can be modified by an algorithm that can correct for the lost degradation. The spliced eye specific images can have full resolution by processing each eye specific image sub-frame to a resolution correcting algorithm that uses information about adjacent pixels to create content for pixels that form when the smaller sub-frame is expanded to a full resolution sub-frame. The technique of FIGS. 3-4 can be used to provide the expanded full resolution images from the 50% resolution sub-frames of the SXS and TB protocols.

Figure 7:
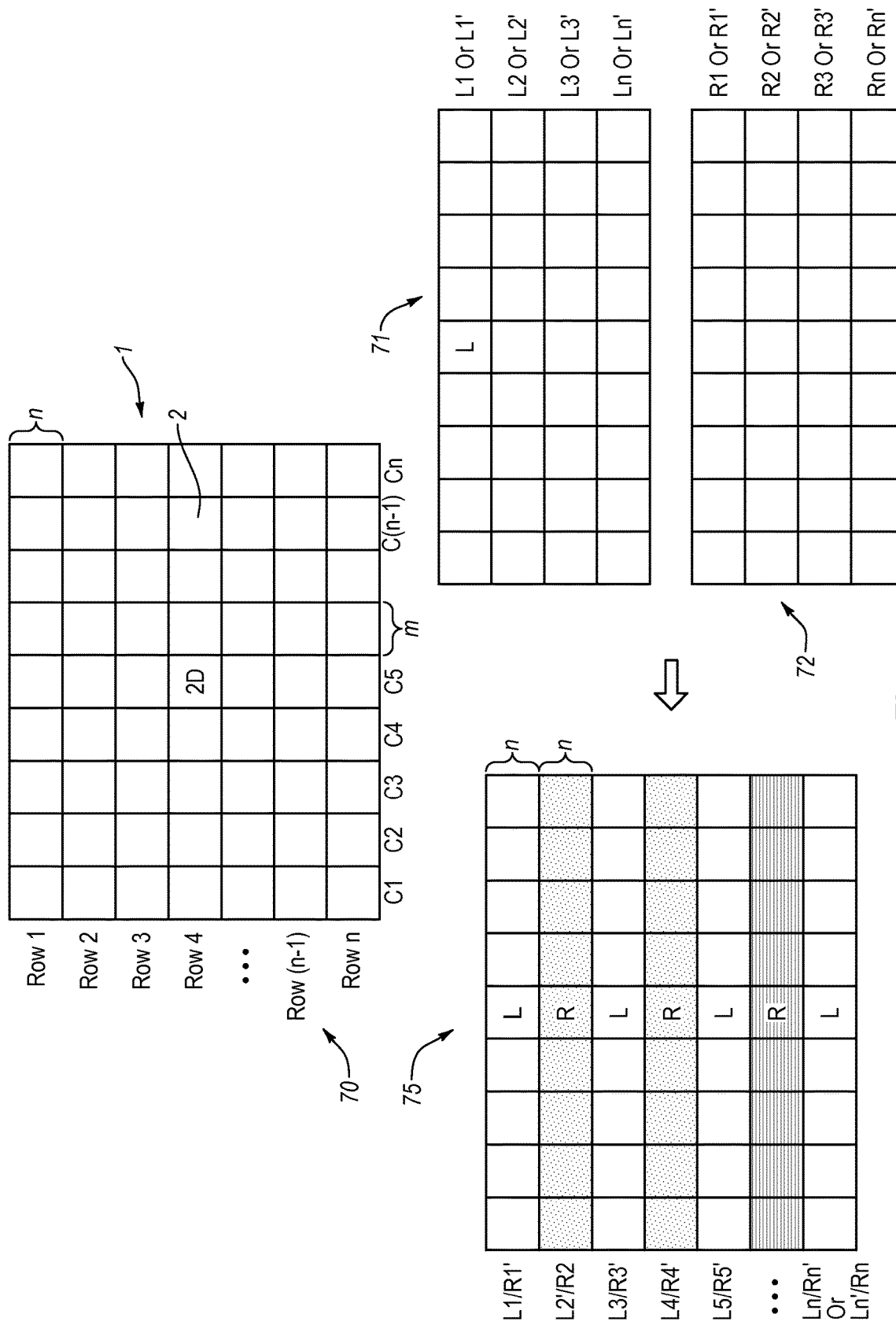
FIG. 7 includes a schematic representation of a method for converting an original image 1 into a merged sub-frame image 70 that is split into a left eye sub-frame 71 and a right eye sub-frame 72, and preparing an image 75 having superimposed pixel rows.

FIG. 7 provides a generic 3D rendering process 70 for providing a 3D image 75 that displays a 3D version of the original image 1. This process maintains some of the resolution of original image 1 that is usually lost in traditional methods for preparing the sub-frames. FIG. 7 illustrates a generic process of creating sub-frames for when there is shortening in the vertical plane with pixel rows 4 being removed in order to obtain the left sub-frame 21 and right sub-frame 22 for the TB protocol. However, this method is generic, and the process of creating the 3D image 75 can be conducted with a left sub-frame 71 and a right sub-frame 72 that is provided using the standard techniques of SXS, TB, FP, or any other technique that provides stereoscopic left and right sub-frames. The original image 1 in 2D format is shown to have pixels 2 that are formed into horizontal pixel rows in sequence of: Row 1, Row 2, Row 3, Row 4, and so on up to Row (n−1), and Row n. The odd pixel rows are placed into a left sub-frame 71 and the even pixels are placed into a right sub-frame 72, and a conversion algorithm creates the correct left eye sub-frame 71 and right eye sub-frame 72. However, in order to have a 3D image the left sub-frame 71 can be an inverse sub-frame having inverted pixel orientation as described in more detail below in connection to FIG. 10. Essentially, inverted pixel rows (e.g., designated with the prime ') are created. While it is illustrated that an inverted pixel row is created for each row in the sub-frame 71, only the inverted pixel rows that are used in the image 75 need to be generated.

With regard to the image of left eye sub-frame 71, the regular pixel rows can be designated as L1, L2, L3, and so on up to pixel row Ln. However, when an inverted pixel row, the pixel rows can be designated as L1', L2', L3' and so on up to inverted pixel row Ln'. With regard to the image of right eye sub-frame 72, the regular pixel rows can be designated as R1, R2, R3, and so on up to pixel row Rn. However, when an inverted pixel row, the pixel rows can be designated as R1', R2', R3' and so on up to inverted pixel row Ln'. An inverted pixel row is a pixel row that is inverted compared to the pixel row for the other eye. For example, inverted pixel row L1' would look inverted when viewed with the left eye; however, the inverted pixel row L1' would look normal when viewed with the right eye. Accordingly, the inverted pixel rows for one eye are actually displayed as a pixel row seen by the other eye.

The 3D image 75 is derived from the original image 1 by using the pixel rows for the left eye sub-frame 71 and the pixel rows for the right eye sub-frame 72 and the corresponding inverted pixel rows of an inverted right sub-frame and left sub-frame. The 3D image 75 shows that the pixels of the pixel rows from the left eye sub-frame 71 are individually superimposed with individual pixels of the inverted pixel rows from the inverted right eye sub-frame 72, and configured to be shown to the left eye. That way, the data from the inverted right eye pixel row appears to be normal when viewed by the left eye. Correspondingly, the pixel rows from right eye sub-frame 72 are individually superimposed with individual pixels of the inverted pixel rows from the inverted left sub-frame 71 so that the data of the superimposed pixel that comes from the inverted left sub-frame 71 appears to be normal when seen with the right eye. As such, the 3D image has pixels row L1/R1' (to be seen by left eye) resulting from superimposing the pixels of pixel rows L1 and R1' of the sub-frame 71 and inverted sub-frame 72, and then preparing the rest of the 3D image pixel rows (e.g., L2'/R2 (seen by right eye), L3/R3' (seen by left eye), L4'/R4 (seen by right eye), L5/R5' (seen by left eye), and so on up to Ln/Rn' (seen by left eye) or to Ln'/Rn (seen by right eye) in a similar superimposing manner. The pixels 2 of pixel row L1/R1' can include an average of the data from the corresponding pixels in both pixel row L1 and inverted pixel row R1', and the new pixels of pixel row L2'/R2 provide the pixels of L2' and R2 with some transparency. The average of the new pixels in the L1/R1' pixel row can be weighted averages from the individual pixels from pixel rows L1 and R1'. A transparency factor can determine the relative transparency of the corresponding pixels of pixel rows L1 and R1' that is used to obtain the resulting new pixel of pixel rows L1/R1'. That is, each pixel can be a combination of a partially transparent pixel of L1 and either a non-transparent or partially transparent pixel of R1', or vice versa. In some instance one of the pixels of L1 or R1' are not transparent, and in another instance both pixels are partially transparent in forming the new pixel.

With reference to FIG. 4, the new pixels for the pixel row L1/R1' and so on can be averages between the pixels of L1 and R1' so that the value of the new pixel is X. That is, the new pixel is a combination of the corresponding pixels of pixel rows L1 and R1', which is determined mathematically.

As such, the pixels of L1 can be represented by pixel A and the pixels of R1' can be represented by pixel B. In one example, each new pixel of the pixel row L1/R1' can be X, which X=(L1+R1')/2. In another example, each new pixel of the pixel row L1/R1' is Y, which Y=(L1+X)/2 or Y=(R1'+X)/2. In another example, each new pixel of the pixel row L1/R1' can be Z, which Z=(Y+X+L1)/3 or Z=(Y+X+R1')/3 depending on if matching the adjacent pixel of pixel row L1 or the adjacent pixel of pixel row R1'. Alternatively, Z can be Z=(X+Y)/2 to be weighted for either L1 or R1'. Similar to the pixel rows illustrated in FIG. 7 used for TB or FP protocols, the same superimposing protocol can be done with pixel columns for SXS protocols, where one of the pixel columns is from an inverted pixel column.

The recombination of the sub-frames into viewable images provides the 3D effect that is viewable to an observer of the image on a display screen. As such, the images of the sub-frames are parsed into pixel rows of one or more pixels in width, with n being an integer that can range from 1 up to about 25% of the total number of pixels along the vertical axis. The value for n can be varied in order to control the quality of the resulting 3D image. The use of n being 1 can provide pixel-by-pixel control when preparing the pixel rows that will be viewed by the left eye or by the right eye. However, n can range from 1 to 25, from 1 to 15, from 1 to 10, or from 1 to 5. The value of n can also be programmable and tunable on the fly.

The methodologies of FIG. 7 can be implemented by a computing system, such as a television, video source, 3D rendering device, or like computing component that can generate, render, or show 3D images and video. Accordingly, the methodologies can be implemented as computer program products that are stored on a memory device with computer executable instructions that cause the computer to execute certain functions as described. In one embodiment, the computing method can include a method of superimposing pixel strips, such as: obtaining a pixel strip for a specific eye; obtaining an inverted pixel strip for the other eye (e.g., the inverted pixel strip for the other eye was originally for the other eye before inversion); and superimposing the pixel strip and inverted pixel strip to form a superimposed pixel strip that includes pixels having pixel data from corresponding pixels of the pixel strip and inverted pixel strip. This can include preparing the inverted pixel strip as described herein. The pixel strip for the specific eye is a right or left eye pixel strip and the inverted pixel strip is for the other eye (e.g., viewed as inverted by the other eye), or the pixel strip is for the left eye and the inverted pixel strip is for the right eye (e.g., viewed as inverted by the right eye). In one aspect, superimposing the pixel strips includes: identifying data of each pixel of the pixel strip and for the inverted pixel strip; and combining the data of each pixel of the pixel strip with data of the corresponding pixel of the inverted pixel strip. The method can include combining pixel data for the pixels of the pixel strip and pixel data for the pixels of the inverted pixel strip such that data of superimposed pixels is based on data from both the pixel strip and inverted pixel strip. The method can include individually superimposing individual pixels of the pixel strip and inverted pixel strip to form superimposed pixels of the superimposed pixel strip.

In one aspect, the method can include one or more of: defining a specific pixel in the pixel strip as Pixel A and defining a specific pixel in the inverted pixel strip as Pixel B, wherein Pixel A and Pixel B are corresponding pixels to be superimposed to form a superimposed pixel, and wherein Pixel A has data A and Pixel B has data B; calculating data X, wherein data X=(data A+data B)/2; using data X for the superimposed pixel; calculating data Y, wherein data Y=(data A+data X)/2; calculating data Y, wherein data Y=(data B+data X)/2; or using data Y for the superimposed pixel. The method can include preparing a superimposed pixel for each pixel of the superimposed pixel strip, wherein the pixel strips are pixel rows or the pixel strips are pixel columns. This protocol can be used or combined with any of the methods described herein.

The method of superimposing pixel strips can be used for preparing 3D images having the superimposed pixel strips, the method comprising preparing a superimposed image from pixel strips and inverted pixel strips of a left eye image and pixel strips and inverted pixel strips of a right eye image. This can include: obtaining a right eye image having right eye pixel strips; obtaining a plurality of inverted right eye pixel strips; obtaining a left eye image having left eye pixel strips; obtaining a plurality of inverted left eye pixel strips; and preparing a plurality of superimposed pixel strips that each include a pixel strips for a left or right eye and an inverted pixel strips for the other eye. Then, the 3D image that includes the superimposed pixel strip(s) can be rendered. This protocol can be used or combined with any of the methods described herein.

In one embodiment, a method of preparing a 3D image can include: obtaining a plurality of pixel strips for a specific eye and a plurality of pixel strips for the other eye; obtaining a plurality of inverted pixel strips for the specific eye and a plurality of inverted pixel strips for the other eye; and superimposing the corresponding pixel strips and inverted pixel strips to form a plurality of superimposed pixel strips that include pixels having pixel data from corresponding pixels of the superimposed pixel strips and inverted pixel strips, the superimposed pixel strips together form a 3D image. This can also include preparing the inverted pixel strips. Also, the pixel strips for the specific eye can be only superimposed with corresponding inverted pixel strips for the other eye. Additionally, the method can include only obtaining pixel strips and inverted pixel strips to be combined into the superimposed pixel strips. The method can include obtaining a first pixel strip for the specific eye or other eye, which first pixel strip is a top or bottom pixel row or a furthest left or right pixel column, and including the first pixel strip in its location in the 3D image.

In one embodiment, superimposing the pixel strips for preparing a 3D image can include: identifying data of each pixel of the pixel strips and for the inverted pixel strips; and combining the data of each pixel of the pixel strip with data of the corresponding pixel of the inverted pixel strip in order to prepare the superimposed pixel strips. The method can include combining pixel data for the pixels of the pixel strips and pixel data for the pixels of the inverted pixel strips such that data of superimposed pixels is based on data from both the pixel strip and inverted pixel strip. The method can include individually superimposing individual pixels of the pixel strips and inverted pixel strips to form superimposed pixels of the superimposed pixel strips.

The method of preparing a 3D image can include preparing a superimposed image from pixel strips and inverted pixel strips of a left eye image and pixel strips and inverted pixel strips of a right eye image, and including: obtaining a right eye image having right eye pixel strips; obtaining a plurality of inverted right eye pixel strips; obtaining a left eye image having left eye pixel strips; obtaining a plurality of inverted left eye pixel strips; and preparing a plurality of superimposed pixel strips that each include a pixel strips for a left or right eye and an inverted pixel strips for the other eye. The 3D image that includes the superimposed pixel strips can be rendered. The 3D image can include a top, bottom, right-most, or left-most pixel strip having a superimposed pixel strip formed from a left eye pixel strip and a right eye inverted pixel strip. The 3D image can include a next to top, next to bottom, next to right-most, or next to left most pixel strip having a superimposed pixel strip formed from a left eye inverted pixel strip and a right eye pixel strip. The 3D image can include a second to top, second to bottom, second to right-most, or second to left most pixel strip having a superimposed pixel strip formed from a left eye pixel strip and a right eye inverted pixel strip. The 3D image can includes a third to top, third to bottom, third to right-most, or third to left most pixel strip having a superimposed pixel strip formed from a left eye inverted pixel strip and a right eye pixel strip. The 3D image can include a top, bottom, right-most, or left most pixel strip having a superimposed pixel strip formed from a left eye inverted pixel strip and a right eye pixel strip or from a left eye pixel strip and a right eye inverted pixel strip. The 3D image can have a superimposed pixel strip L1/R1' to be seen by left eye resulting from superimposing the pixels of pixel strip L1 and inverted pixels of inverted pixel strip R1'. In one aspect, the 3D image can include: superimposed pixel strip L2'/R2 to be seen by right eye, superimposed pixel strip L3/R3' to be seen by left eye, superimposed pixel strip L4/R4' to be seen by left eye, superimposed pixel strip L5/R5' to be seen by left eye, and so on up to superimposed pixel strip Ln/Rn' to be seen by left eye or superimposed pixel strip Ln'/Rn to be seen by right eye, wherein primes indicated inverted pixel strips. The 3D image can have superimposed pixels strip L1'/R1 to be seen by right eye, superimposed pixel strip L2/R2' to be seen by left eye, superimposed pixel strip L3'/R3 to be seen by right eye, superimposed pixel strip L4'/R4 to be seen by right eye, superimposed pixel strip L5'/R5 to be seen by right eye, and so on up to superimposed pixel strip Ln'/Rn to be seen by right eye or superimposed pixel strip Ln/Rn' to be seen by left eye, wherein primes indicated inverted pixel strips.

Figure 8:
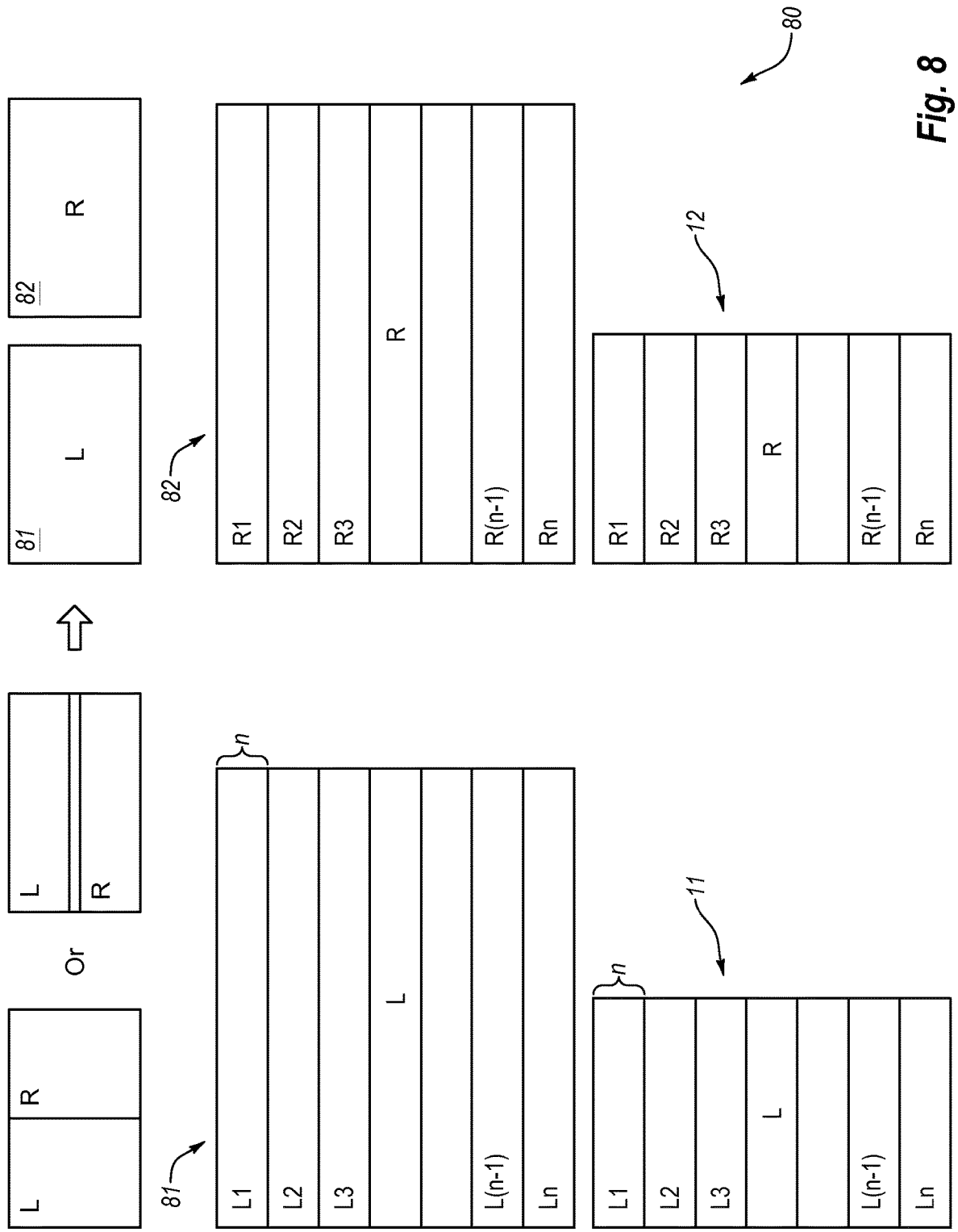
FIG. 8 includes a schematic representation of a method 80 for horizontally parsing a left eye sub-frame 81 and a right eye sub-frame 82 into pixel rows.

FIG. 8 shows a process 80 of parsing the sub-frames 81 and 82 into viewable images that are displayed. The sub-frames 81, 82 are obtained as full sized images as described herein. The left eye sub-frame 81 is parsed into horizontal pixel rows L1, L2, L3, and so on up to L(n−1), and Ln, where the "L" designates rows to be seen by the left eye. Similarly, right eye sub-frame 82 is parsed into horizontal pixel rows R1, R2, R3, and so on up to R(n−1), and Rn, where "R" designates rows to be seen with the right eye. The data of the individual pixels of pixel rows of sub-frames 81 and 82 are separated according to the pixel rows, and then will be recombined based on the combination algorithm to provide the data for the 3D image based on the recombination of the horizontal pixel rows of the different sub-frames 81, 82. Inverted pixel rows can also be prepared.

Also, the images of the sub-frames 81 and 82 that illustrate that the parsed layers can represent the parsed layers of sub-frames 11, 12 for SXS and 21, 22 for TB protocols. A more proportional illustration of sub-frames 11 and 12 with the parsed layers also shown.

Figure 9A:
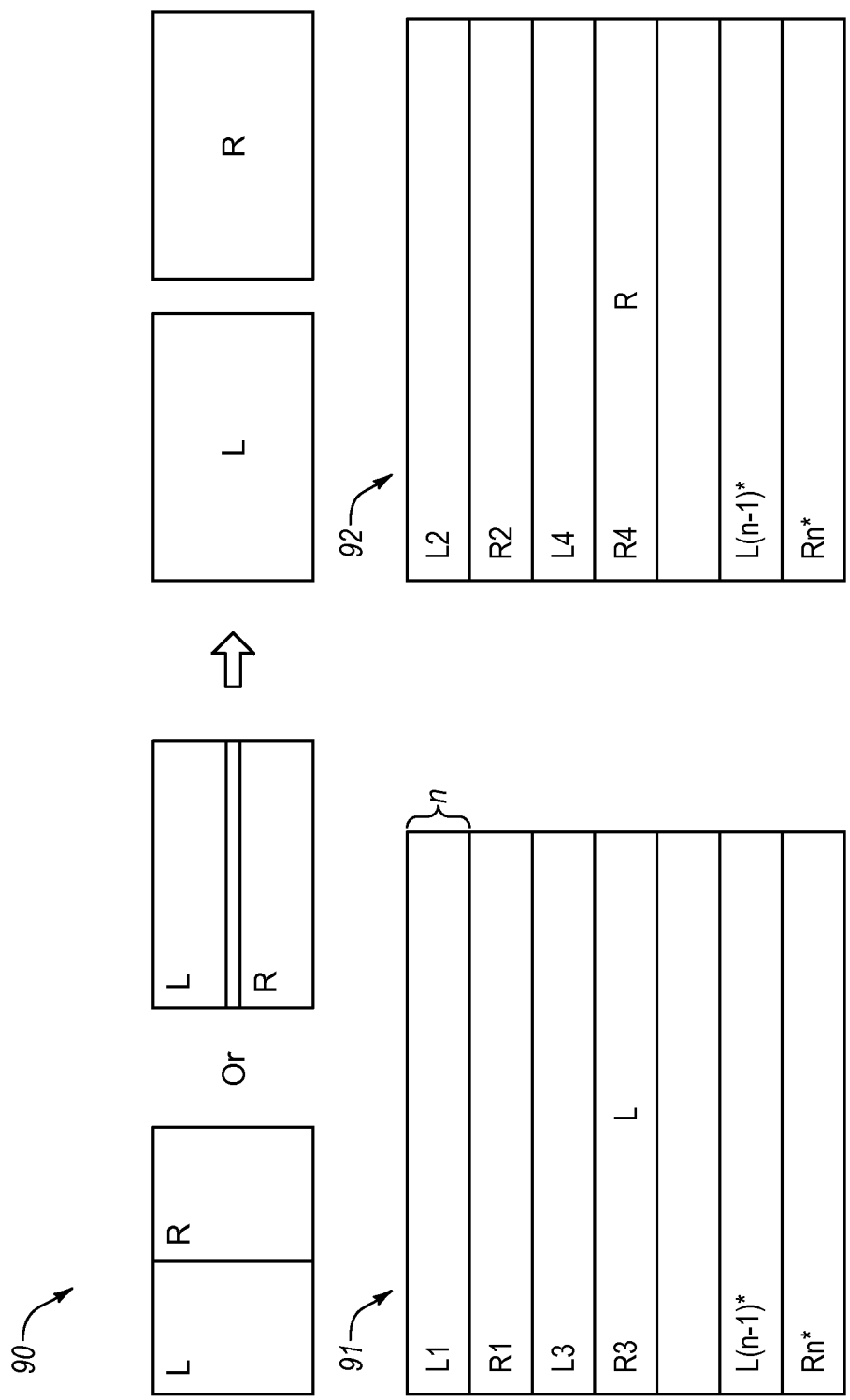
FIG. 9A includes a known method 90 for splicing the pixel rows for a left eye sub-frame 91 and a right eye sub-frame 92, which when displayed in a sequential matter under side-by-side or top-and-bottom protocols renders 3D imagery.

FIG. 9A illustrates a method 90 for recombining the strips obtained from the pixel row parsing process of FIG. 8. FIG. 9A shows that the left eye sub-frame 91 is formed from pixel rows in sequence of L1 (for left eye), R1 (for right eye), L3 (for left eye), R3 (for right eye), and so on up to L(n−1) (for left eye), and Rn (for right eye). The right eye sub-frame 92 is formed from pixel rows in sequence of L2 (for left eye), R2 (for right eye), L4 (for left eye), R4 (for right eye), and so on up to L(n−1) (for left eye), and Rn (for right eye). This is commonly done in SXS protocol.

The 3D image can be shown by any 3D capable display monitor, such as a television or computer monitor display. As such, the image of sub-frame 91 or 92 can be used in the passive display format described in connection to FIG. 1, and active glasses, such as polarized glasses 26, can then be used by a viewer in order to view the 3D images of the video. Also, it should be noted that the "*" indicates that the bottom two pixel rows may be R(n−1) and Ln for sub-frames 91 and/or 92.

Figure 9B:
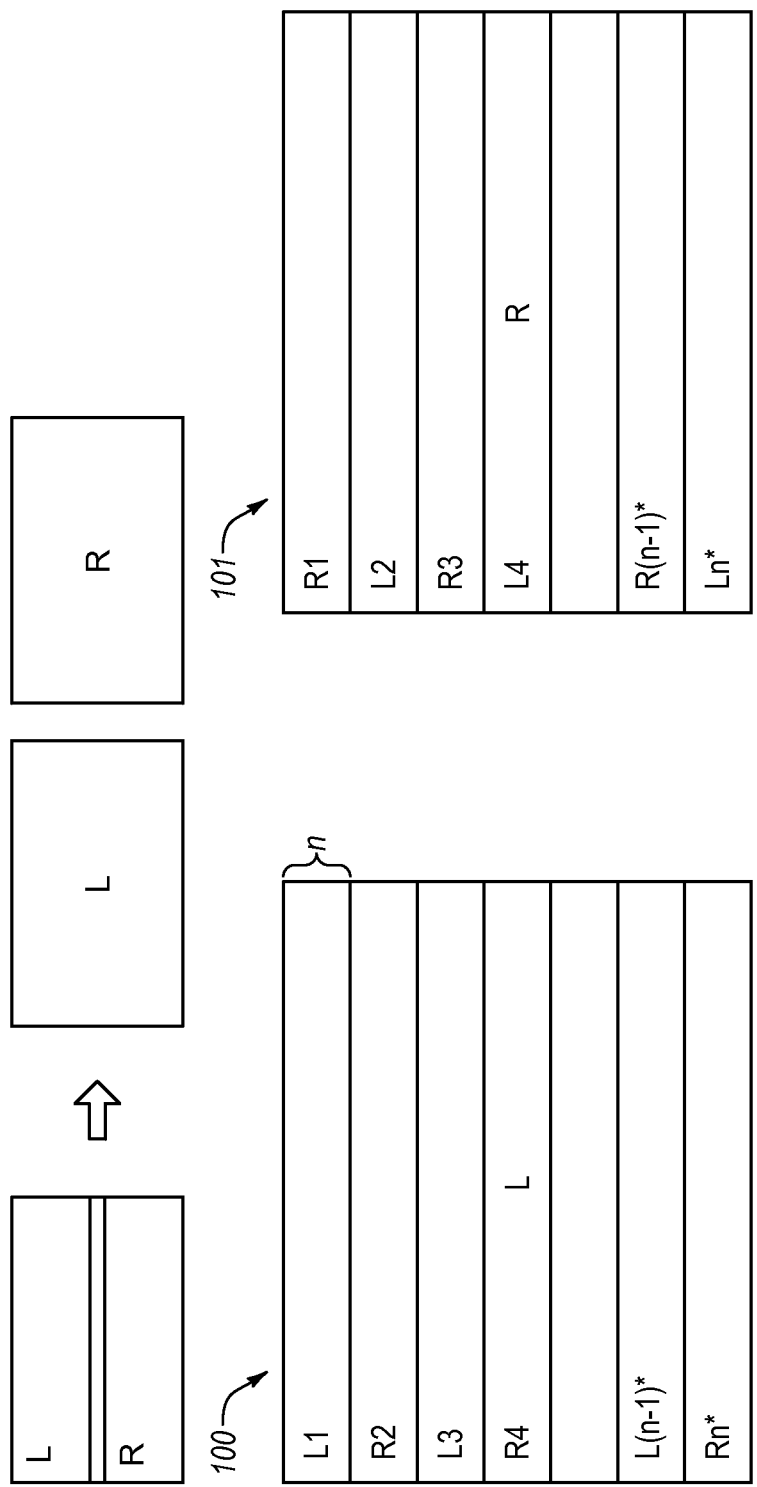
FIG. 9B includes a spliced left eye sub-frame 100 and right eye sub-frame 101 for being sequentially displayed with a frame packing protocol to render 3D imagery.
Figure 9C:
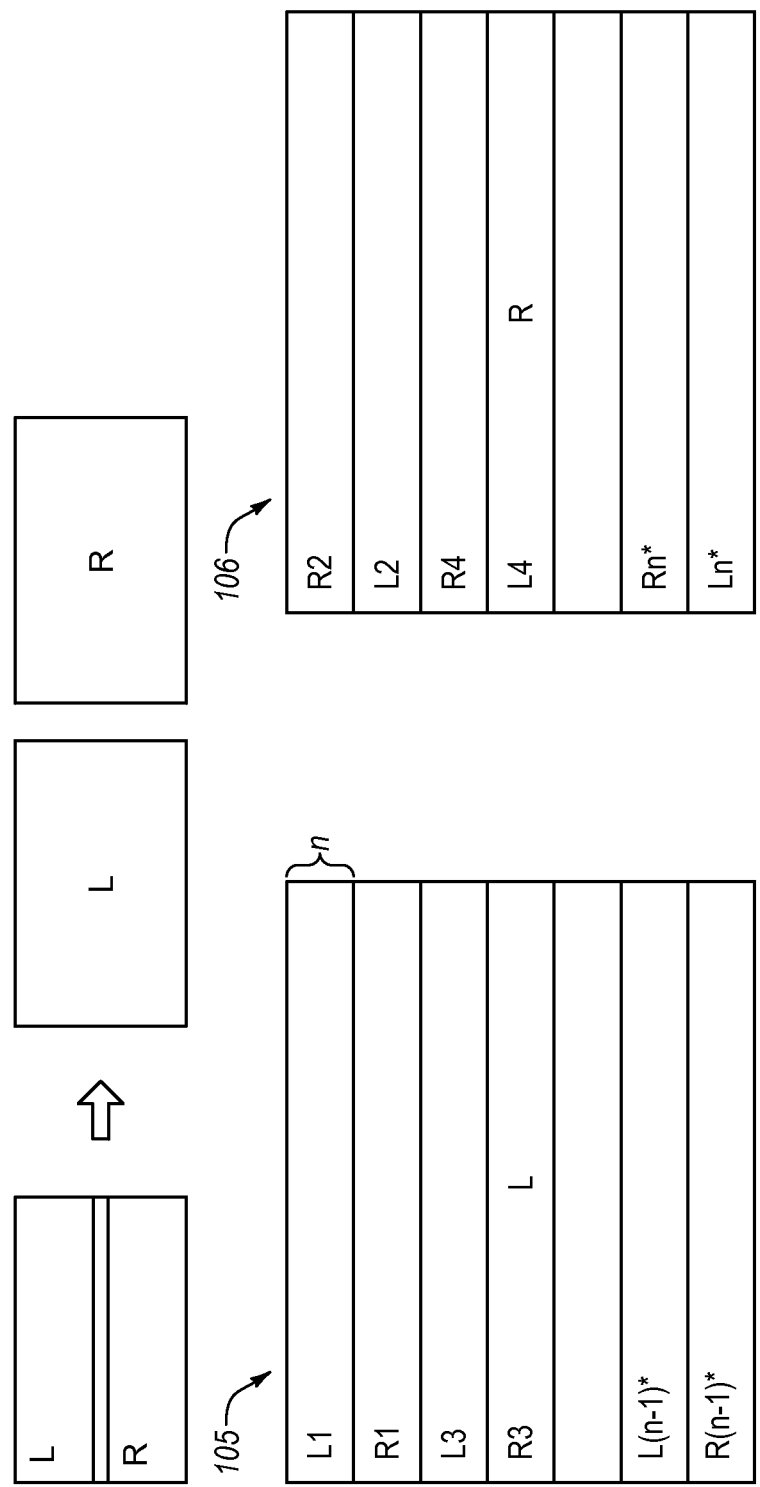
FIG. 9C includes a spliced left eye sub-frame 105 and right eye sub-frame 106 for being sequentially displayed with a frame packing protocol to render 3D imagery.

FIG. 9B shows a recombining protocol for FP, which provides the illustrated recombined pixel rows of the left eye sub-frames 100 and right eye sub-frames 101. FIG. 9C shows an alternative recombining protocol for FP, which provides the illustrated recombined pixel rows of the left eye sub-frames 105 and right eye sub-frames 106. These sub-frames 100, 101 or 105, 106 can be used sequentially with active 3D technologies, or one of the sub-frames 100, 101 or 105, 106 can be selected for display with passive 3D technologies.

However, it can be determined that the recombination protocols of FIGS. 9A-9C do not provide the eyes of the viewer full resolution of the original image when viewed as a 3D image using the passive 3D technologies. The SXS protocol results in a 50% loss in resolution when configured for displays that operate with active 3D glasses (e.g., Samsung, Sony, etc.) and has a 75% loss when configured for displays that operate with passive 3D glasses (e.g., LG, Vizio, etc.). The TB protocol results in a 50% loss in resolution when configured for displays that operate with active 3D glasses (e.g., Samsung, Sony, etc.) and has a 50% loss when configured for displays that operate with passive 3D glasses (e.g., LG, Vizio, etc.). The FP protocol results in a 0% loss in resolution when configured for displays that operate with active 3D glasses (e.g., Samsung, Sony, etc.) and has a 50% loss when configured for displays that operate with passive 3D glasses (e.g., LG, Vizio, etc.). For clarity, 3D images from left and right sub-frames are for active glasses technologies (e.g., shutter 3D glasses), and the single image with alternating strips from the left and right sub-frames are for the passive glasses technologies (e.g., polarized glasses). As such, an aspect of the invention includes a 3D rendering protocol that is devoid of using the independent methodologies of FIG. 9A, FIG. 9B, and/or FIG. 9C.

Loss of resolution can occur when there are two full sized sub-frames that need to be combined to view as a 3D image. In part, this is because the two images need twice the data space. The current techniques are not suitable for putting two images into one 3D image. For the case of SXS and TB, the techniques can first resize the sub-frames in the horizontal or vertical dimensions. The full sized sub-frames are intermediates and not actually displayed. Reference to intermediate frames or sub-frames herein identify frames or sub-frames that are not actually displayed to render 3D images.

Also, it should be noted that the FPR displays are constructed in such a way that the left eye strips are only viewed by the left eye and right eye strips are only seen by the right eye. Commonly, the strips are 1 pixel thick, but can be more than 1 pixel in some instances. The pixel rows for the horizontal strips can be "n" thick, where n is as defined herein.

The recombination protocol of the present invention can be used as a modified SXS, TB, FP, or any other 3D protocol, and can provide about 0% loss in resolution when configured for displays that operate with active 3D glasses (e.g., Samsung, Sony, etc.) and with passive 3D glasses (e.g., LG, Vizio, etc.). As such, the recombination protocol of the present invention can be adapted across all 3D protocols for full high definition 3D (FHD3D).

If a left or right eye pixel strip of the sub-frames that belongs to one eye is placed on the strip location that should have the strip for the other eye, the result is that the amount of displacement on the X axis for each pixel with respect to its location on the other eye will be reversed or inverted by exactly the same amount. This reversed or inverted displacement can be corrected by again displacing each pixel of the pixel strip by the same amount in the other direction on the X axis. For example, if a user with passive 3D glasses uses the glasses upside-down, the effect is that everything close goes further away and everything in the image that should be far becomes closer. This is because of the way humans see depth perception. The eyes look at pixel images and see displacement from one pixel to the other.

However, if during 3D image rendering, a human looks at the left eye strip with the right eye everything becomes reversed with regard to displacement. If the data is reversed or inverted and then reversed or inverted again, the 3D image becomes normal. Every pixel of a pixel strip for one eye and the corresponding pixel of the pixel strip for the other eye can be compared for displacement with regard to the other eye. Reversing or inverting the amount of displacement of the pixels for one eye compared to the other can be used for rendering 3D imagery as described below. Each pixel of the right eye pixel strip and left eye pixel strip are compared to determine which pixels of the different strips go together for a 3D image, and whether there is a right or left shift in the corresponding pixel along the X axis. 3D correction can be achieved by creating a reversed pixel strip for the other eye that has the corresponding pixels shifted in the opposite direction from the pixel location for the pixel strip of the first eye. The reversed pixel strip can be referred to as an inverted pixel strip or a negative pixel strip, and are denoted by primes (i.e., an apostrophe or ') herein. The inverted pixel strip can include the corresponding pixels oriented in the opposite direction on the X axis in comparison to the shift from the first pixel strip, and thereby the pixels are inverted. The first pixel strip can be the right pixel strip or the left pixel strip, and then the pixel strip for the other eye can be converted into a negative pixel strip that has pixels in the opposite orientation from the pixels of the first pixel strip. This process is described in more detail below.

Figure 10:
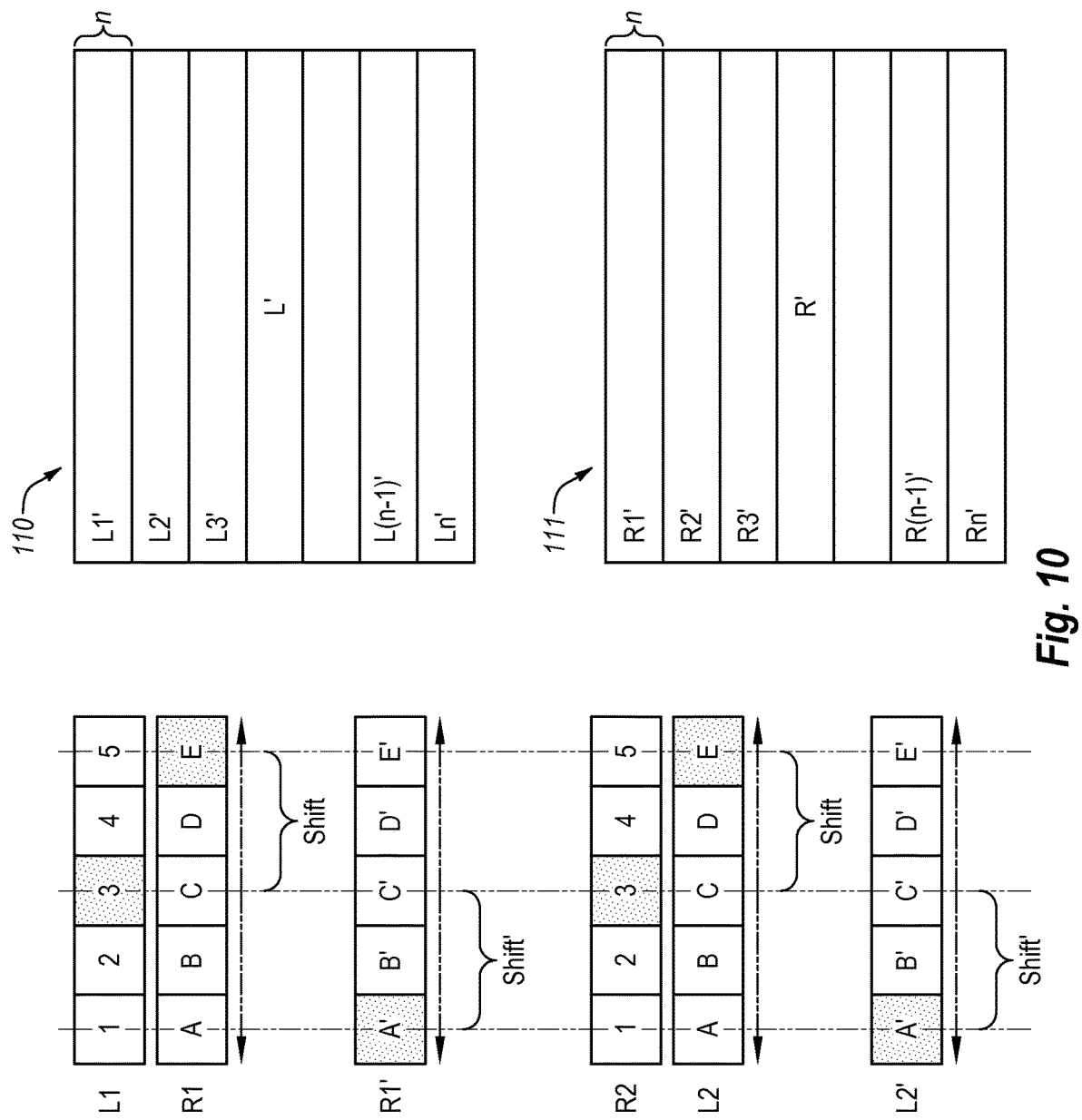
FIG. 10 includes a method of preparing intermediate inverted pixel strips, which inverted pixel strips can represent inverted pixel rows or inverted pixel columns.

FIG. 10 illustrates a method of preparing inverted pixel strips that can be used with the present invention in order to render 3D images. The process is to create inverted pixel strips based on the pixel strips of the sub-frames. While not all of the pixel strips need to be converted to inverted pixel strips, the example of FIG. 10 is shown to illustrate converting all pixel strips of the sub-frames into inverted pixel strips. In practice, however, only 50% of the pixel strips would need to be converted into inverted pixel strips, which can be the odd row pixel strips or the even row pixel strips depending on the 3D image that will be rendered. The process can proceed with only selected pixel strips to be inverted, which selected pixel strips are only the pixel strips that will be used in 3D rendering. The inverted pixel strips are designated with a prime (') to differentiate the regular pixel strip with the inverted pixel strip. The inverted pixel strips include the pixels inverted by the same displacement, but in the opposite direction on the X axis. The inversion of pixels on an inverted pixel strip is based on the corresponding pixel of the corresponding pixel strip for the other eye. The process can be performed with left frame and/or right frame. The following example of creating inverted pixel strips is exemplary only, and the process can be performed with all pixels of a pixel strip and all or some pixel strips of an image. The inverted pixel strip has all of the pixels inverted compared to the corresponding pixel strip. For example, an inverted right eye pixel strip appears normal when viewed by the left eye.

As shown in FIG. 10, L1 is the top pixel strip of the left eye sub-frame, and R1 is the top pixel strip of the right eye sub-frame. As shown, center pixel 3 of the L1 pixel strip corresponds with pixel E of the R1 pixel strip (same shading). That is, for a 3D image, pixel 3 of the L1 pixel strip corresponds with pixel E of the R1 pixel strip, and thereby pixel 3 and pixel E together provide the 3D effect. For each pixel of a pixel strip for one eye, the corresponding pixel of the pixel strip for the other eye is identified. The shift or displacement along the X axis is determined for each pixel. As a basis, L1 can be used as the set pixel strip and R1 can be the pixel strip that is converted into an inverted pixel strip that is designated as R1'. That is R1' is the inverted pixel strip of R1. The distance of value of the shift from pixel 3 to pixel E is identified. The value of the shift is then employed to shift the data of pixel E to a corresponding location on the X axis compared to pixel 3 in order to generate pixel strip R1'. The inverted pixel strip R1' has the data of pixel E of pixel strip R1 now at pixel A', where the pixel A' is has the same shift from pixel 3, but in the other direction. Now, pixel 3 and pixel A' can be used together and superimposed for the 3D effect, where the 3D effect portion from pixel A' is backwards; however, when displayed on the screen to a viewer pixel A' will be displayed along with pixel 3 to the left eye. Since pixel E was for the right eye, when pixel A' is viewed by the left eye, the 3D rendering will be correct.

A similar process for all pixels of pixel strip R1 can be performed in order to obtain pixel strip R1', which is an inverse pixel strip of R1. By performing the same process with all of the pixels of pixel strip R1, the inverted pixel strip R1' will have pixel data that when seen with the left eye will provide correct 3D imagery.

Additionally, the process of creating an inverted pixel strip can be performed with the right eye pixel strip R2 being set and the shift of the corresponding pixels in pixel strip L2 is determined so that an inverted pixel strip L2' can be generated. The L2' inverted pixel strip is generated in the same manner as the inverted pixel strip R1' described above. The inverted pixel strip L2' includes pixel A' that corresponds with pixel 3 of pixel strip R2 and pixel A' is shifted the same distance in the other direction as pixel E of pixel strip L2 is shifted in comparison with pixel 3 of pixel row R2.

From the foregoing, inverted sub-frames 110 and 111 can be prepared, where inverted sub-frame 110 is inverted from the left eye sub-frame and inverted sub-frame 111 is from the right eye sub-frame. As mentioned above, only 50% of the pixel strips or every other pixel strip needs to have an inverted pixel strip prepared. The fully inverted sub-frame 110, 111 can be prepared, but do not need to be prepared. The inverted sub-frames 110, 111 can include the even or odd inverted pixel strips, and may only have 50% of the pixel strips of the original sub-frames. Any number of pixel strips of the original sub-frames can be inverted as long as about half or more of the pixel strips are inverted. In another way, only the pixel strips of the right eye that will be seen by the left eye after being superimposed need to be inverted, which also applies to the left eye pixel strips being inverted that will be seen by the right eye after superimposed. At least half of the pixel strips are inverted for the left eye sub-frame and the right eye sub-frame so that the inverted pixel strips for a left eye inverted sub-frame and right eye inverted sub-frame can be combined with the regular or normal pixel strips for the opposite eye in order to render a 3D image.

The pixel strips of FIG. 10 are illustrated to be pixel rows for use in 3D displays that use horizontal pixel strips in order to prepare the 3D image for use with passive glass technology. However, the pixel strips of FIG. 10 can be pixel columns for use in 3D displays that do not use glasses, such as lenticular 3D displays as was as with 3D displays with dynamic or transistor controlled pixel illumination or darkening to provide 3D imagery that can be viewed without glasses. Thus, the generation of the inverted sub-frames can be done with the left and right eye sub-frames in either the vertical or horizontal direction. As such, the inverted pixel strips can be inverted pixel rows or inverted pixel columns depending on the type of display. For example, a FPR TV would use inverted pixel rows, while a lenticular TV would use inverted pixel columns.

The methodologies of FIG. 10 can be implemented by a computing system, such as a television, video source, 3D rendering device, or like computing component that can generate, render, or show 3D images and video. Accordingly, the methodologies can be implemented as computer program products that are stored on a memory device with computer executable instructions that cause the computer to execute certain functions as described. In one embodiment, the computing method can include a method of preparing inverted pixel strips, such as inverted pixel columns and inverted pixel rows, as well as portions thereof. The computing method for inverting pixel strips can include: providing a first pixel strip of pixels of a first full image; providing a second pixel strip of pixels of a second full image, wherein the first pixel strip and second pixel strip correspond in location in the first and second full images, wherein one or the first or second full image is a right eye image and the other is a left eye image, wherein the first pixel strip and second pixel strip having corresponding pixels for a 3D image rendered from the first and second full images, and wherein the corresponding pixels of the first pixel strip are displaced in location with respect to each other; and inverting one of the first or second pixel strip so that the displaced location of the corresponding pixel strip is inverted with respect to the first and second full images. However the first and second full images can be substituted by sub-frames, such as right eye and left eye sub-frames, and the inverted pixel strips can be prepared from the sub-frames. Also, instead of corresponding pixel strips from the first and second images, the pixel strips can be adjacent or separated by one or more other pixel strips; however, corresponding (e.g., corresponding in column or row line and placement in the figure) pixel strips can be advantageous for 3D rendering when one pixel strip is inverted. The pixel strip inverting method can include identifying one or more first pixels of the first pixel strip; and identifying one or more second pixels of the second pixel strip that correspond with each other in a 3D image rendered from the first and second full images. The inverted pixel strip can be configured for a specific eye and appears inverted for the specific eye. The inverted pixel strip can appear inverted when viewed with the specific eye and/or through a lens of 3D glasses configured for the specific eye. The inverted pixel strip can appear normal (e.g., not inverted) when viewed with the specific eye and/or through a lens of 3D glasses that is configured for the other eye. Also, the inverted pixel strip can appear normal (e.g., not inverted) to the specific eye when inverted again, where the second inversion rights the pixel strip for the intended eye. The method can determine the amount of pixel strip axial displacement for the corresponding pixels of the first and second pixel strips, wherein the amount of pixel strip axial displacement can be related to 3D depth of a 3D image rendered from the first and second images or pixel strips thereof. The displacement distance can be modified depending on desired depth.

In one embodiment, the computing method for pixel strip inversion can include determining one or more pixels of the first and second pixel strips that go together when viewing a 3D image, and the inverted pixel strip is prepared by inverting the displacement of the pixels of one of the pixel strips compared to the pixels of the other pixel strip. The method can also include creating the inverted pixel strip such that corresponding pixels of the inverted pixel strip are shifted in the opposite direction on the pixel strip axis by a displacement distance substantially equal to the original displacement of both non-inverted first and second pixel strips. One of the first or second pixel strips is for a right eye image and the other is for the left eye image.

The computing method can also include preparing one or more inverted pixel strips for one or more of the first image or second image. This can include preparing inverted pixel strips for about 50% of the pixel strips of the first image and/or second image. This may also include preparing inverted pixel strips for the even pixel strips across an axis of the first image and/or second image, and/or preparing inverted pixel strips for odd pixel strips across an axis of the first image and/or second image. Alternatively, this can include preparing inverted pixel strips for every pixel strip across an axis of the first image and/or second image that are to be used when rendering a 3D image of the first and second images.

In one embodiment, the method for pixel strip inversion can include identifying pixel strip L1 for the left eye image and identifying pixel strip R1 for the left eye image, wherein pixel strips L1 and R1 correspond in location with the respective images. The method can further include: theoretically aligning the pixels of pixel strips L1 and R1; identifying one or more corresponding pixel pairs having one pixel in pixel strip L1 and one pixel in pixel strip R1; determining a displacement distance and displacement direction between corresponding pixels of the corresponding pixel pairs along the pixel strip axis; and inverting one of the pixel strips L1 or R1 such that the corresponding pixels of the corresponding pixel pairs are located at the displacement distance in an opposite displacement direction.

The pixel strip inversion methods can include one or more of: designating the inverted pixel strip with an indicator thereof; causing the inverted pixel strip to include pixel data for each of the pixels thereof inverted in the opposite displacement direction at the displacement distance from the normal (e.g., non-inverted) pixel strip; preparing an inverted left eye image having about at least 50% of pixel strips being inverted from the normal left eye image; preparing an inverted right eye image having about at least 50% of pixel strips being inverted from the normal right eye image; identifying pixel strips of the left eye image that will be seen by the right eye in the rendered 3D image, and inverting these identified pixel strips; or identifying pixel strips of the right eye image that will be seen by the left eye in the rendered 3D image, and inverting these identified pixel strips. The left eye pixel strips can be left eye pixel rows and the right eye pixel strips can be right eye pixel rows, or the left eye pixel strips can be left eye pixel columns and the right eye pixel strips can be right eye pixel columns. The method can include: providing a first image having a plurality of first pixel strips that combine to form the first full image (or sub-frame thereof); and providing a second full image having a plurality of second pixel strips that combine to form the second full image (or sub-frame thereof), wherein one or the first or second full image (or sub-frame) is a right eye image and the other is a left eye image.

Figure 11:
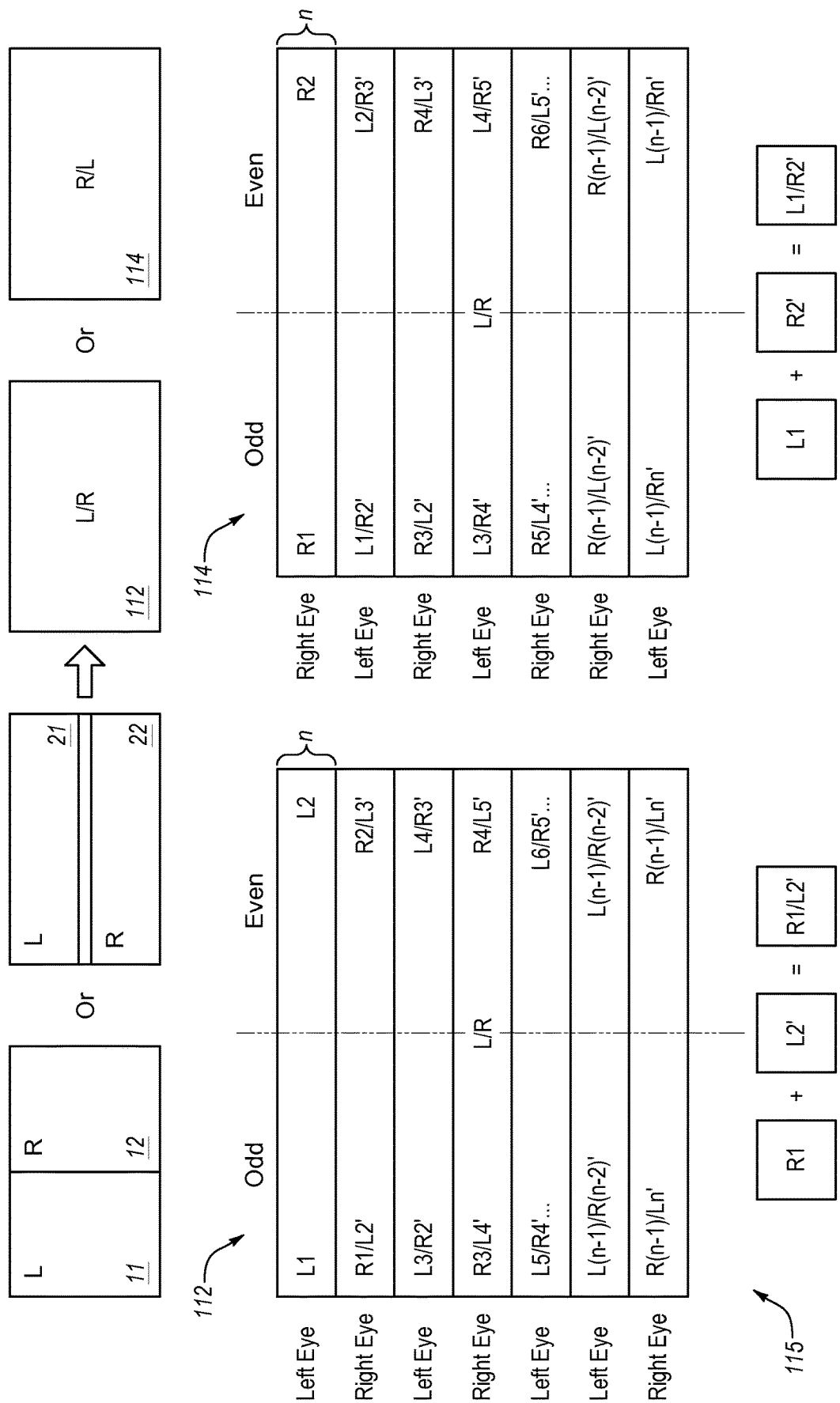
FIG. 11 includes a method of preparing different versions of 3D images using pixel strips and superimposed pixel strips prepared from pixel rows and inverted pixel rows.

FIG. 11 illustrates a recombination or splicing process 115 for combining eye specific sub-frames 11, 12, or 21, 22 along with inverted pixel strips of inverted sub-frames 110 and 111 into frames 112 or 114 to provide a single frame with 3D effects that is configured for the passive technologies (e.g., FPR TVs, lenticular, or other). The frames can start with either an odd pixel row, such as L1 or R1, or start with an even pixel row, such as L2 or R2. As such, each frame is show with the top row being an odd row from a sub-frame on the left and the corresponding frame with the top row being an even row on the right. That is, the frame can be generated with either an odd row on top (e.g., L1 in 112 or R1 is 114) or an even row on top (e.g., L2 in 112 or R2 is 114). Either the odd or even pixel strip orientation is prepared for a single frame.

The 3D effect is obtained by showing the L/R image frame 112 or the R/L image fame 114 for each frame, which provides 100% resolution for the resulting 3D images that are viewed. The image size reconfiguration process described in FIGS. 3-4 for either the horizontal plane or vertical plane can be used to resize the sub-frames at any time during the process in order to provide the frames 112, 114 having full resolution. Since the image size reconfiguration process can be combined with the 3D display process, the process 115 can be used for SXS and TB protocols with little loss of true resolution. The image size reconfiguration process can estimate the new pixels during resizing to provide an accurate estimation of the original pixels. Any loss of resolution arises from the image size reconfiguration process; however, this loss has been determined to be negligible for a user viewing the 3D imagery that results from the process 115.

The frame 112 is prepared to include the following superimposed pixel rows in sequence of: L1 (which does not include a superimposed pixel row and is to be seen with the left eye), R1/L2' (for right eye), L3/R2' (for left eye), R3/L4' (for right eye), L5/R4' (for left eye), and so on up to L(n−1)/R(n−2)' (for left eye), and R(n−1)/Ln' (for right eye). The superimposed pixel row R1/L2' includes the pixels from row R1 of the right eye sub-frame and L2' from the left eye inverted sub-frame being superimposed with some transparency such that the data of the pixel from R1 and the pixel from L2' is displayed. In reference to FIG. 10, pixel 3 and pixel A' would be superimposed. The superimposing can be performed with alpha blending, or a process similar to FIGS. 3-4, where the data is from pixel 3 and pixel A' of FIG. 10 instead of pixels A and B of FIG. 3. The pixels for superimposed pixel rows includes: R1/L2' (e.g., combines pixels from pixel row R1 and inverted pixel row L2'), L3/R2' (e.g., combines pixels from pixel rows L3 and R2'), R3/L4' (e.g., combines pixels from pixel rows R3 and L4') and so on up to L(n−1)/R(n−2)' (e.g., combines pixels from pixel rows L(n−1) and R(n−2)'), and R(n−1)/Ln' (e.g., combines pixels from pixel rows R(n−1) and Ln'). The data of pixels from both the pixel rows R1 and L2' are superimposed on each other with transparency so that the data from both pixels are combined. Similarly, the pixels of regular and inverted pixel rows can be combined with transparency to produce the frame 114 having the following superimposed pixel rows in sequence R1 (not superimposed and to be seen with the right eye), L1/R2' (for left eye), R3/L2' (for right eye), L3/R4' (for left eye), R5/L4' (for right eye), and so on up to R(n−1)/L(n−1)' (for right eye), and L(n−1)/Rn' (for left eye).

While the foregoing superimposing of regular pixel rows and inverted pixel rows is based on the top row being an odd row (illustrated on left side), a similar technique can be performed with either the top row being null or the top row being even (illustrated on right side). The null and even inverted sub-frames would be identical, but shifted in number, where null would be blank on top. The even inverted sub-frames are shown on the right side of 3D frames 112 and 114, while the odd inverted sub-frames are shown on the left side of the 3D frames 112 and 114. That is, either the even or odd 3D frame configurations is used, and only one of frames 112 and 114 would be displayed. As such, FIG. 11 shows four different 3D frame possibilities: odd 112; even 112; odd 114; and even 114.

It should be noted that the top row may also be used as a bottom row such that the sequence starts from the bottom and goes to the top such that the bottom rows for the four possibilities are L1, L2, R1, or R2.

The pixels of the superimposed pixel rows having pixel data from two different pixels can be combined with transparency so one or both images have some transparency. For example, the first recited pixel can be displayed at X % transparency with the second recited pixel being displayed at Y % transparency for a new pixel having resolution of 100%. The X % transparency can range from 25% to 75% of the original display value, and more preferably is about 50% of the original display value. The Y % transparency can similarly range from 25% to 75% of the original display value, and more preferably be about 50% of the original display value. The transparency values can range in order to see the data of both pixels combined into one pixel.

The pixels of pixel row R1/L2' can include an average of the data from the corresponding pixels in both pixel row R1 and inverted pixel row L2', and the new pixels of pixel row R1/L2' provide the pixels of pixel row R1 and inverted pixel row L2' with some transparency. The average of the new pixels in the R1/L2' pixel row can be weighted averages from the individual pixels from pixel rows R1 and L2'. A transparency factor can determine the relative transparency of the corresponding pixels of pixel rows R1 and L2' that are used to obtain the resulting new pixel of pixel rows R1/L2'. That is, each pixel can be a combination of a partially transparent pixel of R1 and either a non-transparent or partially transparent pixel of L2', or vice versa. In some instance one of the pixels of R1 or L2' are not transparent, and in another instance both pixels are partially transparent in forming the new pixel.

With reference to FIG. 3-4, the new pixels for the pixel row R1/L2' and so on can be averages between the pixels of R1 and L2' so that the value of the new pixel is determined from the data of both R1 and L2'. With reference to FIG. 10, the pixels are combined as follows: pixel A if R1 is combined with pixel A' of L2', and so on. That is, the new pixel is a combination of the corresponding pixels of pixel rows R1 and L2', which is determined mathematically. In one example, each new pixel of the pixel row R1/L2' can be X, which X=(R1+L2')/2. In another example, each new pixel of the pixel row R1/L2' is Y, which Y=(R1+X)/2 or Y=(L2'+X)/2. In another example, each new pixel of the pixel row R1/L2' can be Z, which Z=(Y+X+R1)/3 or Z=(Y+X+L2')/3 depending on if matching the adjacent pixel of pixel row R1 or the adjacent pixel of inverted pixel row L2'. Alternatively, Z can be Z=(X+Y)/2 to be weighted for either R1 or L2'. Other permutations can be conducted to obtain a R1/L2' pixel as desired such that the entire image appears to be 3D when viewed using the proper technology. The pixels of the other pixel rows of the 3D frames 112 and 114 can similarly be determined from the regular pixel rows and inverted pixel rows.

The data for each pixel, such as the pixels from the pixel rows R1 and L2' can be data commonly used for pixels. The data of the pixels can include colors that can be obtained with pixels without limitation. The data of the pixels can include various color variations that include intensity, hue, saturation, value, brightness, luminescence, or other feature of a color of a pixel. Accordingly, the R1/L2' pixels can be a blend of the colors of the R1 and L2' pixels. For example, the colors of the pixels from R1 and L2' can be blended to form the R1/L2' pixel so that the visual representation of the R1/L2' is similar to blending paints on an overhead projector.

The methodologies of FIG. 11 can be implemented by a computing system, such as a television, video source, 3D rendering device, or like computing component that can generate, render, or show 3D images and video. Accordingly, the methodologies can be implemented as computer program products that are stored on a memory device with computer executable instructions that cause the computer to execute certain functions as described. In one embodiment, the computing method can include a method of preparing a 3D image, such as: obtaining a plurality of pixel rows for a specific eye and a plurality of pixel rows for the other eye; obtaining a plurality of inverted pixel rows for the specific eye and a plurality of inverted pixel rows for the other eye; and superimposing the corresponding pixel rows and inverted pixel rows to form a plurality of superimposed pixel rows that include pixels having pixel data from corresponding pixels of the superimposed pixel rows and inverted pixel rows; and forming a 3D image having a top and/or bottom pixel row with the rest being superimposed pixel rows such that at least one pixel row is not a superimposed pixel row. The method can include preparing the inverted pixel rows. The pixel rows for the specific eye can be superimposed with corresponding inverted pixel rows for the other eye. The superimposed pixel rows can include a first pixel row of a first pixel row location of a first image for the specific eye and a second inverted pixel row of a second pixel row location of a second image for the other eye, wherein the first and second pixel row locations are adjacent pixel row locations in the first image and the second image. The method can include obtaining a first pixel row for the specific eye or other eye, which first pixel row is a top or bottom pixel row or a furthest left or right pixel column, and including the first pixel row in its location in the 3D image. In one aspect, superimposing the pixel rows can include: identifying data of each pixel of the pixel rows and for the inverted pixel rows; and combining the data of each pixel of the pixel row with data of the corresponding pixel of the inverted pixel row in order to prepare the superimposed pixel rows, wherein the pixel row is from a first location in a first image and the inverted pixel row is from a second location in a second image, the first location being adjacent to the second location in the first image and second image. The method can include combining pixel data for the pixels of the pixel rows and pixel data for the pixels of the inverted pixel rows such that data of superimposed pixels is based on data from both the pixel row and inverted pixel row. The method can include individually superimposing individual pixels of the pixel rows and inverted pixel rows to form superimposed pixels of the superimposed pixel rows. The method can include defining a specific pixel in a first pixel row from a first location as Pixel A and defining a specific pixel in a second inverted pixel row from a second location adjacent to the first location as Pixel B, wherein Pixel A and Pixel B are corresponding pixels to be superimposed to form a superimposed pixel, and wherein Pixel A has data A and Pixel B has data B, and then calculating and/or using X and or Y for the data of the superimposed pixel. The method can include preparing a superimposed pixel for each pixel of each of the superimposed pixel rows. Optionally, the 3D image is configured as the odd or even arrangement of frame 112 or frame 114 in FIG. 11. The 3D image can be configured for being viewed with active or passive 3D glasses. The method can include preparing the 3D image from pixel rows and inverted pixel rows of a left eye image and pixel rows and inverted pixel rows of a right eye image, which can include: obtaining a plurality of right eye pixel rows; obtaining a plurality of inverted right eye pixel rows; obtaining a plurality of left eye pixel rows; obtaining a plurality of inverted left eye pixel rows; and preparing a plurality of superimposed pixel rows that each include a pixel row for a left or right eye from a first location and an inverted pixel rows for the other eye from a second location adjacent to the first location.

Figure 12:
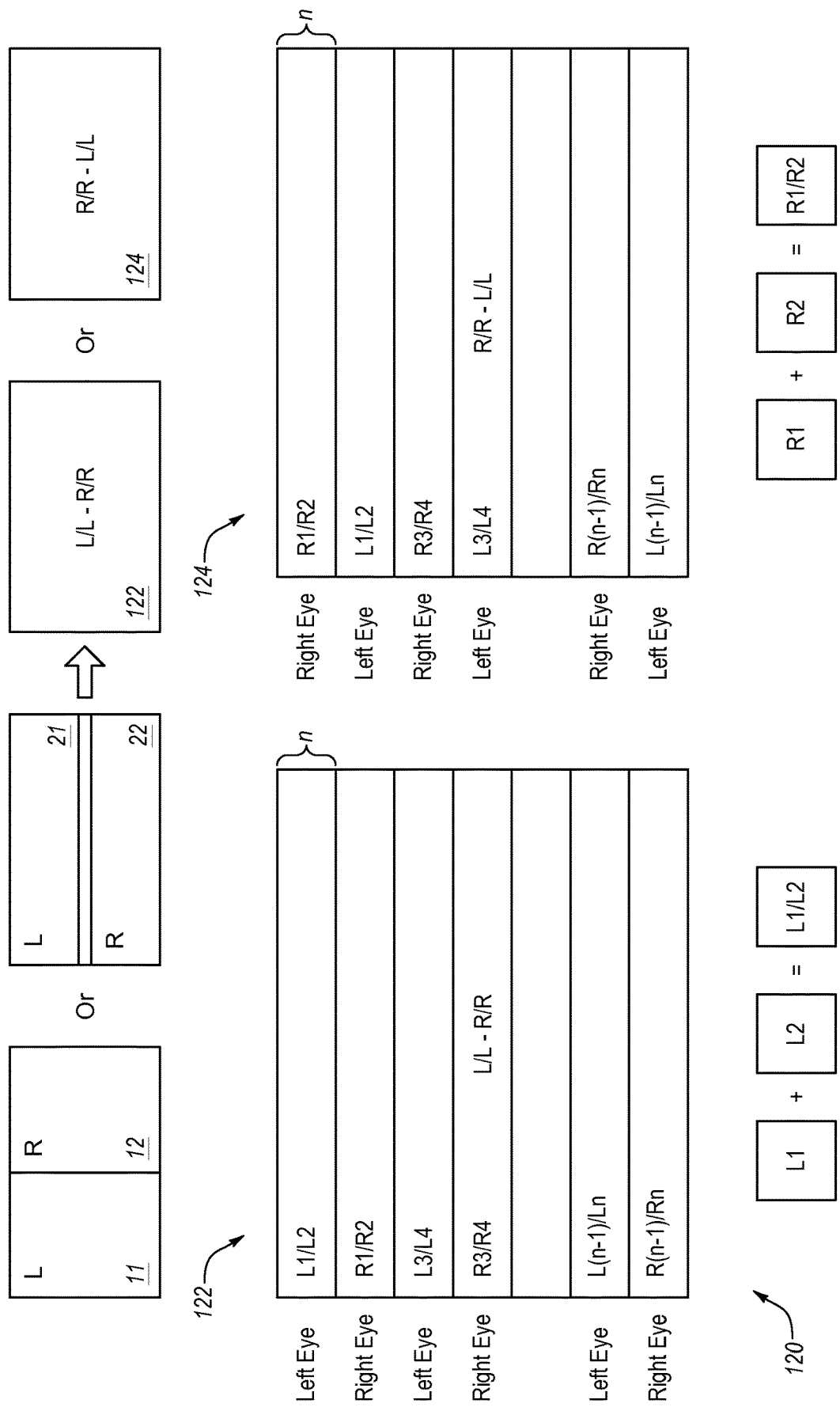
FIG. 12 includes a splicing method to splice superimposed pixels rows into a single full frame.

FIG. 12 illustrates a recombination or splicing process 120 for combining eye specific sub-frames 11, 12, or 21, 22 into a frame 122 or 124 to provide a single frame with 3D effects that is configured for the passive technologies. The 3D effect is obtained by showing the image frame 122 or the image fame 124 for each frame, which provides 100% resolution for the resulting 3D images that are viewed. Here, no inverted pixel strips are used; not inverted pixel rows or inverted pixel columns. This 3D rendering technique can be performed without the preparation of the intermediate inverted frame of 110 or 111. The image size reconfiguration process described in FIGS. 3-4 for either the horizontal plane or vertical plane can be used to resize the sub-frames at any time during the process in order to provide the frames 122, 124 having full resolution. Since the image size reconfiguration process can be combined with the 3D display process, the process 120 can be used for SXS and TB protocols with little loss of true resolution. The image size reconfiguration process can estimate the new pixels during resizing to provide an accurate estimation of the original pixels. Any loss of resolution arises from the image size reconfiguration process, however, this loss has been determined to be negligible for a user viewing the 3D imagery that results from the process 120.

The frame 122 is prepared to include the following superimposed pixel rows in sequence of L1/L2, R1/R2, L3/L4, R3/R4, and so on up to L(n−1)/Ln, and R(n−1)/Rn. The superimposed pixel row L1/L2 includes the pixels from pixel row L1 and pixel row L2 being superimposed with some transparency such that the data of the pixel from L1 and the pixel from pixel row L2 is displayed. The pixels for superimposed pixel rows R1/R2 (e.g., combines pixels from pixel rows R1 and R2), L3/L4 (e.g., combines pixels from pixel rows L3 and L4), R3/R4 (e.g., combines pixels from pixel rows R3 and R4), and so on up to L(n−1)/Ln (e.g., combines pixels from pixel rows L(n−1) and Ln), and R(n−1)/Rn (e.g., combines pixels from pixel rows R(n−1) and Rn). Similarly, the pixels of pixel rows are combined with transparency to produce the frame 124 having the following superimposed pixel rows in sequence R1/R2, L1/L2, R3/R4, L3/L4, R(n−1)/Rn, and L (n−1)/Ln.

It should be noted that the top row may also be used as a bottom row such that the sequence starts from the bottom and goes to the top such that the bottom rows for the possibilities include L1/L2 for frame 122 and R1/R2 for frame 124. Also, the 3D display process with image 122 or image 124 can be performed with the FP protocol with either active 3D glasses technology or provide substantially 100% resolution to passive 3D glasses technology.

Figure 13A:
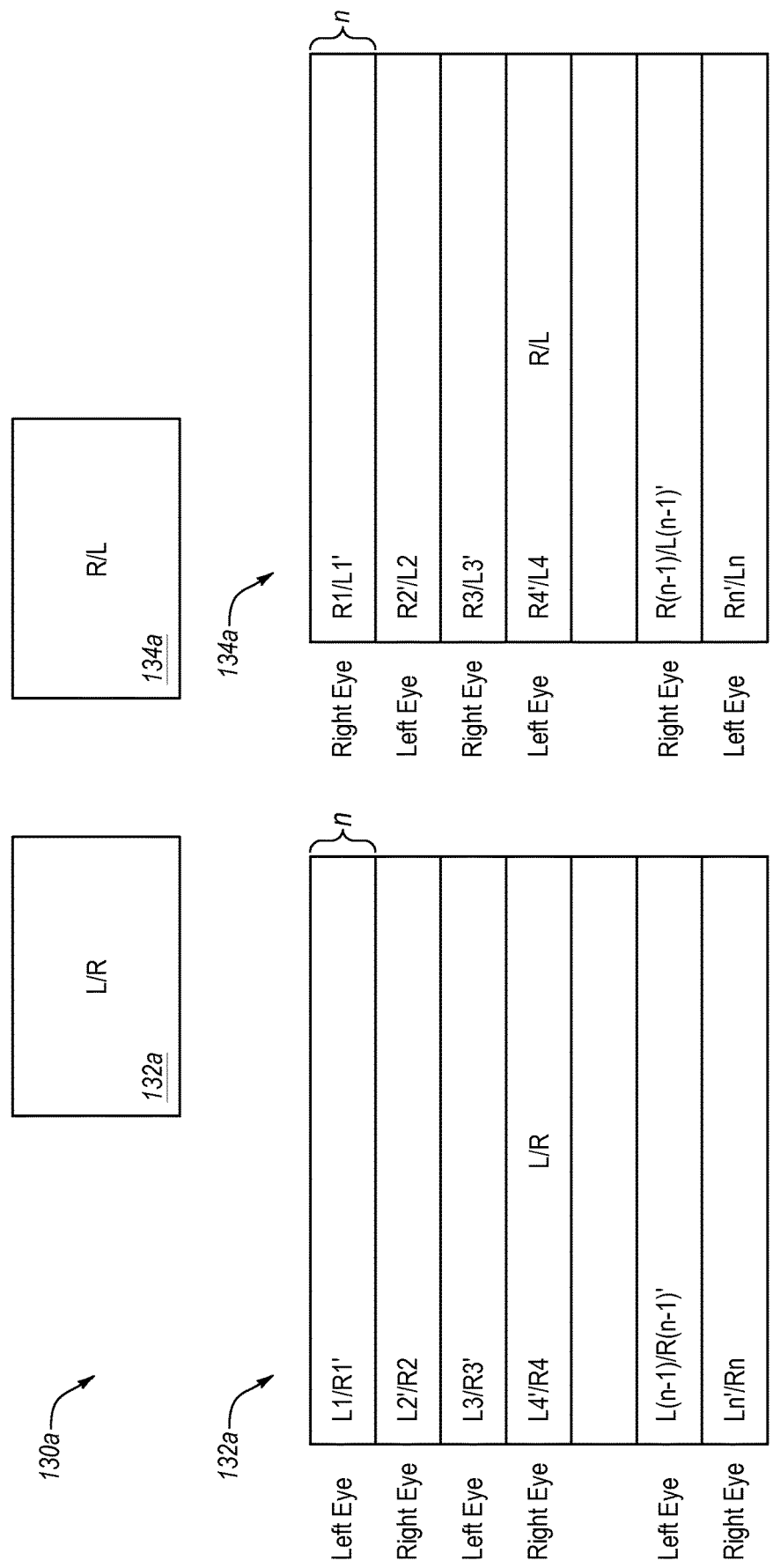
FIG. 13A includes a splicing method to splice superimposed pixels rows into a single full frame.

FIG. 13A illustrates a recombination or splicing process 130*a* to generate a 3D image. This protocol can be configured for use with passive glass technologies, and may be used with FP sub-frames. The resulting images include spliced image 132*a* or spliced image 134*a*, either of which can be displayed in order to show a 3D image. The inverted pixel rows can be obtained as described in connection with FIG. 10. Spliced image 132*a* can include the superimposed pixel rows in sequence: L1/R1' (left eye), L2'/R2 (right eye), L3/R3' (left eye), L4'/R4 (right eye), and so on up to L(n−1)/R(n−1)' (left eye), and Ln'/Rn (right eye). The spliced image 134*a* can include the superimposed pixel rows in sequence: R1/L1' (right eye), R2'/L2 (left eye), R3/L3' (right eye), R4'/L4 (left eye), and so on up to R(n−1)/L(n−1)' (right eye), and Rn'/Ln (left eye). However, it should be recognized that depending on the weighting and/or transparency from the pixels, that the images of spliced images 132*a* and 134*a* may be identical to visual perception. The spliced image 132*a* or spliced image 134*a* is shown as the 3D frame.

It should be noted that the top row may also be used as a bottom row such that the sequence starts from the bottom and goes to the top such that the bottom row for frame 132*a* can be L1/R1' and frame 134*a* can be R1/L1'.

In one embodiment, a computing method of preparing a 3D image in accordance with FIG. 13A can include: obtaining a plurality of pixel rows for a specific eye and a plurality of pixel rows for the other eye; obtaining a plurality of inverted pixel rows for the specific eye and a plurality of inverted pixel rows for the other eye; and superimposing the corresponding pixel rows and inverted pixel rows to form a plurality of superimposed pixel rows that include pixels having pixel data from corresponding pixels of the superimposed pixel rows and inverted pixel rows; forming a 3D image of superimposed pixel rows with the top and/or bottom and/or right-most and/or left most pixel row having: a superimposed pixel row formed from a left pixel row from a first location and a right inverted pixel row from the first location; or a superimposed pixel row formed from a right pixel row from a first location and left inverted pixel row from the first location. The method can include preparing the inverted pixel rows. The pixel rows for the specific eye can be superimposed with corresponding inverted pixel rows for the other eye. The superimposed pixel rows can include a first pixel row of a first pixel row location of a first image for the specific eye and a first inverted pixel row of a first pixel row location of a second image for the other eye, wherein the first pixel row locations are the same pixel row locations in the first image and the second image. The 3D image can consist of superimposed pixel rows; however, non-superimposed pixel rows may be used at the top or bottom, which can apply to any of the methodologies. Superimposing the pixel rows can include: identifying data of each pixel of the pixel rows and for the inverted pixel rows; and combining the data of each pixel of the pixel row with data of the corresponding pixel of the inverted pixel row in order to prepare the superimposed pixel rows, wherein the pixel row is from a first location in a first image and the inverted pixel is from the first location in a second image. The method can include combining pixel data for the pixels of the pixel rows and pixel data for the pixels of the inverted pixel rows such that data of superimposed pixels is based on data from both the pixel row and inverted pixel row. The method can include individually superimposing individual pixels of the pixel rows and inverted pixel rows to form superimposed pixels of the superimposed pixel rows. In one aspect, the 3D image can be configured as in FIG. 13A. Also, the 3D image can be configured for being viewed with active or passive 3D glasses.

Figure 13B:
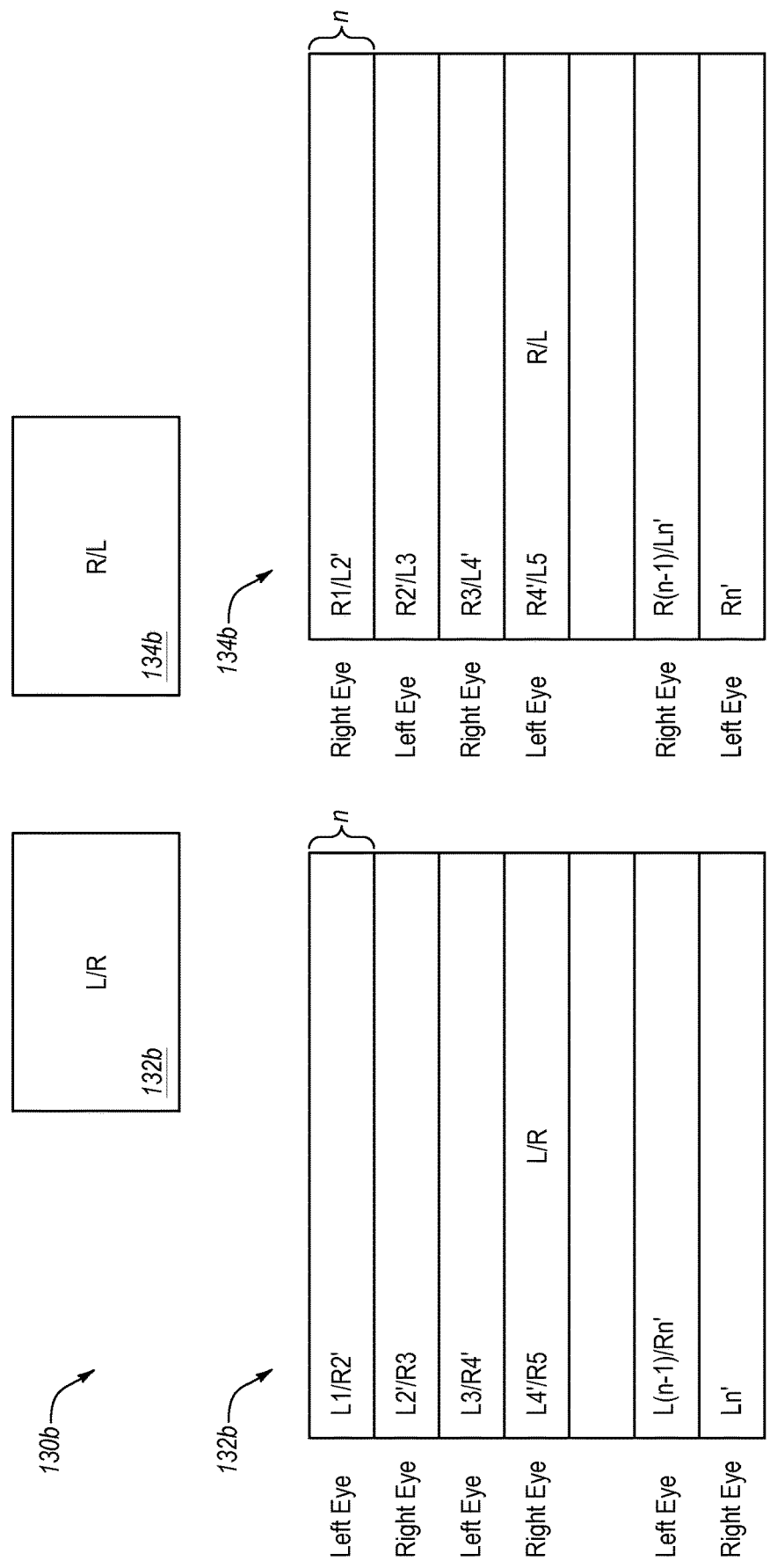
FIG. 13B includes a splicing method to splice superimposed pixels rows into a single full frame.

FIG. 13B illustrates a recombination or splicing process 130*b* to generate a 3D image. This protocol can be configured for use with passive glass technologies. The resulting images include spliced image 132*b* or spliced image 134*b*, either of which can be displayed in order to show a 3D image. Spliced image 132*b* can include the superimposed pixel rows in sequence: L1/R2' (left eye), L2'/R3 (right eye), L3/R4' (left eye), L4'/R5 (right eye), and so on up to L(n−1)/Rn' (left eye), and Ln' (right eye). The spliced image 134*b* can include the superimposed pixel rows in sequence: R1/L2' (right eye), R2'/L3 (left eye), R3/L4' (right eye), R4'/L5 (left eye), and so on up to R(n−1)/Ln' (right eye), and Rn' (left eye). However, it should be recognized that depending on the weighting and/or transparency from the pixels from R1 or L2', that the images of spliced images 132 and 134 may be identical to visual perception. For image 132*b*, L1/R2' may start on the bottom. For image 134*b* R1/L2' may start on the bottom.

In one embodiment, a computing method of preparing a 3D image in accordance with FIG. 13B can include: obtaining a plurality of pixel rows for a specific eye and a plurality of pixel rows for the other eye; obtaining a plurality of inverted pixel rows for the specific eye and a plurality of inverted pixel rows for the other eye; and superimposing the corresponding pixel rows and inverted pixel rows to form a plurality of superimposed pixel rows that include pixels having pixel data from corresponding pixels of the superimposed pixel rows and inverted pixel rows; forming a 3D image of superimposed pixel rows with the top and/or bottom and/or right-most and/or left most pixel row having: a superimposed pixel row formed from a left pixel row from a first location and a right inverted pixel row from the second location; or a superimposed pixel row formed from a right pixel row from a first location and left inverted pixel row from the second location. The method can include preparing the inverted pixel rows.

While the parsing and recombination of pixel rows has been described for systems that use active shutter 3D glasses or passive polarized 3D glasses, the technology can be applied to parsing and recombination of pixel columns for systems that do not use 3D glasses. The parsing and recombination of pixel columns can be used for lenticular optical systems. The column pixels are parsed and recombined in lenticular systems due to the parallax error induced by having horizontally set eyes. Lenticular systems are well known, and can include an electronic hole in each pixel so half is for the right eye and half is for the left eye. An example of a lenticular system that employs 3D imagery is the Nintendo 3DS.

FIG. 14 shows a lenticular method 140 for parsing an image 141 into a left sub-frame 142 and a right sub-frame 144. While the method 140 is referred to as a lenticular method, this method can be applied to any 3D rendering technique that uses vertical strips, where the vertical strips are designated and configured for the right eye or the left eye. The left sub-frame is parsed into pixel columns LC1, LC2, LC3, and so on up to LC(n−1), and LCn. The right sub-frame is parsed into pixel columns RC1, RC2, RC3, and so up to RC(n−1), and RCn. The pixel columns can have a width m that is from one pixel to about 25% of the total horizontal pixels. The number of pixels represented by m can be the same as described for n. The pixel columns can be inverted as described in connection with FIG. 10 so as to provide inverted pixel rows that are inverted pixel columns. Expansion of reduced sized images can be performed similar to as illustrated in FIGS. 3-4. The inverted pixel columns can be used for splicing with regular pixel columns similar to the horizontal pixel rows described above, but the use of pixel columns is useful for lenticular or other passive 3D technologies that do not require 3D glasses or for any 3D technique with vertically oriented pixel strips. Also, the pixel row configurations of FIGS. 9A-9C can be applied to lenticular methods 140, which can be done by using the pixel row arrangement in a vertical or pixel column arrangement. That is, the pixel rows can be turned 90 degrees and used as pixel columns, where the entire 3D rendering technique is performed with vertical pixel columns rather than horizontal pixel rows.

FIG. 15 illustrates a vertically oriented recombination or splicing process 145 for combining eye specific sub-frames along with inverted pixel strips into full 3D frames 147 or 149 to provide a single frame with 3D effects that is configured for the passive technologies (e.g., FPR TVs, lenticular, or other). The splicing process 145 is similar to the process 115 described in FIG. 11, except that the slices are vertical in FIG. 15 where they are horizontal in FIG. 11. As such, the process described in FIG. 11 can be applied to vertical pixel strip arrangements by using the pixel strip configuration in a vertical orientation. The process of generating inverted pixel strips described in connection to FIG. 10 can be also be employed in this process.

The 3D effect is obtained by showing the L/R image frame 147 or the R/L image fame 149 for each frame, which provides substantially 100% resolution for the resulting 3D images that are viewed. The image size reconfiguration process described in FIGS. 3-4 for either the horizontal plane or vertical plane can be used to resize the sub-frames at any time during the process in order to provide the frames 147, 149 having full resolution. The image size reconfiguration process can estimate the new pixels during resizing to provide an accurate estimation of the original pixels. Any loss of resolution arises from the image size reconfiguration process; however, this loss has been determined to be negligible for a user viewing the 3D imagery that results from the process 145.

The frame 147 is prepared to include the following superimposed pixel columns in sequence of LC1 (which does not include a superimposed pixel column) (left eye), RC1/LC2' (right eye), LC3/RC2' (left eye), RC3/LC4' (right eye), LC5/RC4' (left eye), and so on up to LC(n−1)/RC(n−2)' (left eye), and RC(n−1)/LCn' (right eye). The superimposed pixel column RC1/LC2' includes the pixels from column RC1 of the right eye sub-frame and LC2' from the left eye inverted sub-frame being superimposed with some transparency such that the data of the pixel from RC1 and the pixel from LC2' is displayed. In reference to FIG. 10, pixel 3 (RC1) and pixel A' (LC2') would be superimposed. The superimposing can be performed with alpha blending, or a process similar to FIGS. 3-4, where the data is from pixel 3 (RC1) and pixel A' (LC2') of FIG. 10 instead of pixels A and B of FIG. 3-4. The pixels for superimposed pixel columns RC1/LC2' (e.g., combines pixels from pixel column RC1 and inverted pixel column LC2'), LC3/RC2' (e.g., combines pixels from pixel column LC3 and inverted pixel column RC2'), RC3/LC4' (e.g., combines pixels from pixel column RC3 and inverted pixel column LC4') and so on up to LC(n−1)/RC(n−2)' (e.g., combines pixels from pixel column LC(n−1) and inverted pixel column RC(n−2)'), and RC(n−1)/LCn' (e.g., combines pixels from pixel column RC(n−1) and inverted LCn'). The data of pixels from both the pixel columns RC1 and LC2' are superimposed on each other with transparency so that the data from both pixels are combined. Similarly, the pixels of regular and inverted pixel columns are combined with transparency to produce the frame 149 having the following superimposed pixel columns in sequence RC1 (not superimposed) (right eye), LC1/RC2' (left eye), RC3/LC2' (right eye), LC3/RC4' (left eye), RC5/LC4' (right eye), and so on up to RC(n−1)/LC(n−2)' (right eye), and LC(n−1)/RCn' (left eye).

While the foregoing superimposing of regular pixel columns and inverted pixel columns is based on the left column being an odd column, a similar technique can be performed with either the left column being null or the left column being even. The null and even inverted sub-frames would be identical, but shifted in number. The even inverted sub-frames are shown on the bottom side of 3D frames 147 and 149, while the odd sub-frames are shown on the top side of the 3D frames 147 and 149. That is, either the even or odd 3D frame configuration is used, and only one of frames 147 and 149 would be displayed. Thus, out of the four options of splicing patters, only one splicing option would be used and displayed for 3D rendering. As such, FIG. 15 shows 4 different 3D frame possibilities: odd 147; even 147; odd 149; and even 149. The 3D frames of FIG. 15 correspond with the 3D frames of FIG. 11, and the pixels can be similarly determined for preparation of the 3D images. It should be noted that the furthest left column may also be used as a furthest right column such that the sequence starts from the right column and goes to the left column such that the furthest right columns for the four possibilities are L1, L2, R1, or R2.

In one embodiment, a computing method for preparing a 3D image can be performed according to FIG. 15. Such a method can include: obtaining a plurality of pixel columns for a specific eye and a plurality of pixel columns for the other eye; obtaining a plurality of inverted pixel columns for the specific eye and a plurality of inverted pixel columns for the other eye; superimposing the corresponding pixel columns and inverted pixel columns to form a plurality of superimposed pixel columns that include pixels having pixel data from corresponding pixels of the superimposed pixel columns and inverted pixel columns; and forming a 3D image having a top and/or bottom pixel column with the rest being superimposed pixel columns such that at least one pixel column is not a superimposed pixel column. The method can include preparing the inverted pixel columns. The pixel columns for the specific eye can be superimposed with corresponding inverted pixel columns for the other eye. The superimposed pixel columns can include a first pixel column of a first pixel column location of a first image for the specific eye and a second inverted pixel column of a second pixel column location of a second image for the other eye, wherein the first and second pixel column locations are adjacent pixel column locations in the first image and the second image. The computing method can include obtaining a first pixel column for the specific eye or other eye, which first pixel column is a top or bottom pixel row or a furthest left or right pixel column, and including the first pixel column in its location in the 3D image. In one aspect, superimposing the pixel columns can include: identifying data of each pixel of the pixel columns and for the inverted pixel columns; and combining the data of each pixel of the pixel column with data of the corresponding pixel of the inverted pixel column in order to prepare the superimposed pixel columns, wherein the pixel column is from a first location in a first image and the inverted pixel column is from the second location in a second image, the first location being adjacent to the second location in the first image and second image. The method can include combining pixel data for the pixels of the pixel columns and pixel data for the pixels of the inverted pixel columns such that data of superimposed pixels is based on data from both the pixel column and inverted pixel column. The method can include individually superimposing individual pixels of the pixel columns and inverted pixel columns to form superimposed pixels of the superimposed pixel columns. In one aspect, the 3D image is configured as in FIG. 15. In one aspect, the 3D image is configured for being viewed with a lenticular system.

FIG. 16 illustrates another lenticular recombination method 150 for recombining the parsed pixel columns in order to obtain the 3D frame 152 or 3D frame 154. The pixel columns of FIG. 16 correspond with the pixel rows of FIG. 12, and thereby the discussion of FIG. 12 can be applied to FIG. 16 except the pixel rows of FIG. 12 are now pixel columns in FIG. 16. The lenticular images are referred to as such for simplicity, however, it should be recognized that the 3D frames can be used for other glasses 3D rendering techniques. It should be noted that the furthest left column may also be used as a furthest right column such that the sequence starts from the right column and goes to the left column such that the furthest right columns are: LC1/LC2 or RC1/RC2. The frame 152 is prepared to include the following superimposed pixel columns in sequence of LC1/LC2, RC1/RC2, LC3/LC4, RC3/RC4, and so on up to LC(n−1)/LCn, and RC(n−1)/RCn. Similarly, the pixels of pixel rows are combined with transparency to produce the frame 154 having the following superimposed pixel rows in sequence RC1/RC2, LC1/LC2, RC3/RC4, LC3/LC4, RC(n−1)/RCn, and LC(n−1)/LCn.

FIG. 17A illustrates another lenticular recombination method 160a for recombining the parsed pixel columns in order to obtain the 3D frame 162a or 3D frame 164a. The pixel columns of FIG. 17A correspond with the pixel rows of FIG. 13A, and thereby the discussion of FIG. 13A can be applied to FIG. 17A except the pixel rows of FIG. 13A are now pixel columns in FIG. 17A. It should be noted that the furthest left column may also be used as a furthest right column such that the sequence starts from the right column and goes to the left column such that the furthest right columns are: LC1/RC1' or RC1/LC1'. Spliced image 162a can include the superimposed pixel rows in sequence: LC1/RC1' (left eye), LC2'/RC2 (right eye), LC3/RC3' (left eye), LC4'/RC4 (right eye), and so on up to LC(n−1)/RC(n−1)' (left eye), and LCn'/RCn (right eye). The spliced image 164a can include the superimposed pixel rows in sequence: RC1/LC1' (right eye), RC2'/LC2 (left eye), RC3/LC3' (right eye), RC4'/LC4 (left eye), and so on up to RC(n−1)/LC(n−1)' (right eye), and RCn'/LCn (left eye).

In one embodiment, a computing method of preparing a 3D image in accordance with FIG. 17A can include: obtaining a plurality of pixel columns for a specific eye and a plurality of pixel columns for the other eye; obtaining a plurality of inverted pixel columns for the specific eye and a plurality of inverted pixel columns for the other eye; and superimposing the corresponding pixel columns and inverted pixel columns to form a plurality of superimposed pixel columns that include pixels having pixel data from corresponding pixels of the superimposed pixel columns and inverted pixel columns; forming a 3D image of superimposed pixel columns with the top and/or bottom and/or right-most and/or left most pixel column having: a superimposed pixel column formed from a left pixel column from a first location and a right inverted pixel column from the first location; or a superimposed pixel column formed from a right pixel column from a first location and left inverted pixel column from the first location. The method can include preparing the inverted pixel columns. The pixel columns for the specific eye can be superimposed with corresponding inverted pixel columns for the other eye. The superimposed pixel columns include a first pixel column of a first pixel column location of a first image for the specific eye and a first inverted pixel column of a first pixel column location of a second image for the other eye, wherein the first pixel column locations are the same pixel column locations in the first image and the second image. The 3D image may consist of superimposed pixel columns. Superimposing the pixel columns can include: identifying data of each pixel of the pixel columns and for the inverted pixel columns; and combining the data of each pixel of the pixel column with data of the corresponding pixel of the inverted pixel column in order to prepare the superimposed pixel columns, wherein the pixel column is from a first location in a first image and the inverted pixel is from the first location in a second image. The method can include combining pixel data for the pixels of the pixel columns and pixel data for the pixels of the inverted pixel columns such that data of superimposed pixels is based on data from both the pixel column and inverted pixel column. The method can include individually superimposing individual pixels of the pixel columns and inverted pixel columns to form superimposed pixels of the superimposed pixel columns. In one aspect, the 3D image is configured for being viewed with a lenticular system. In one aspect, the 3D image is configured as shown in FIG. 17A.

Figure 17B:
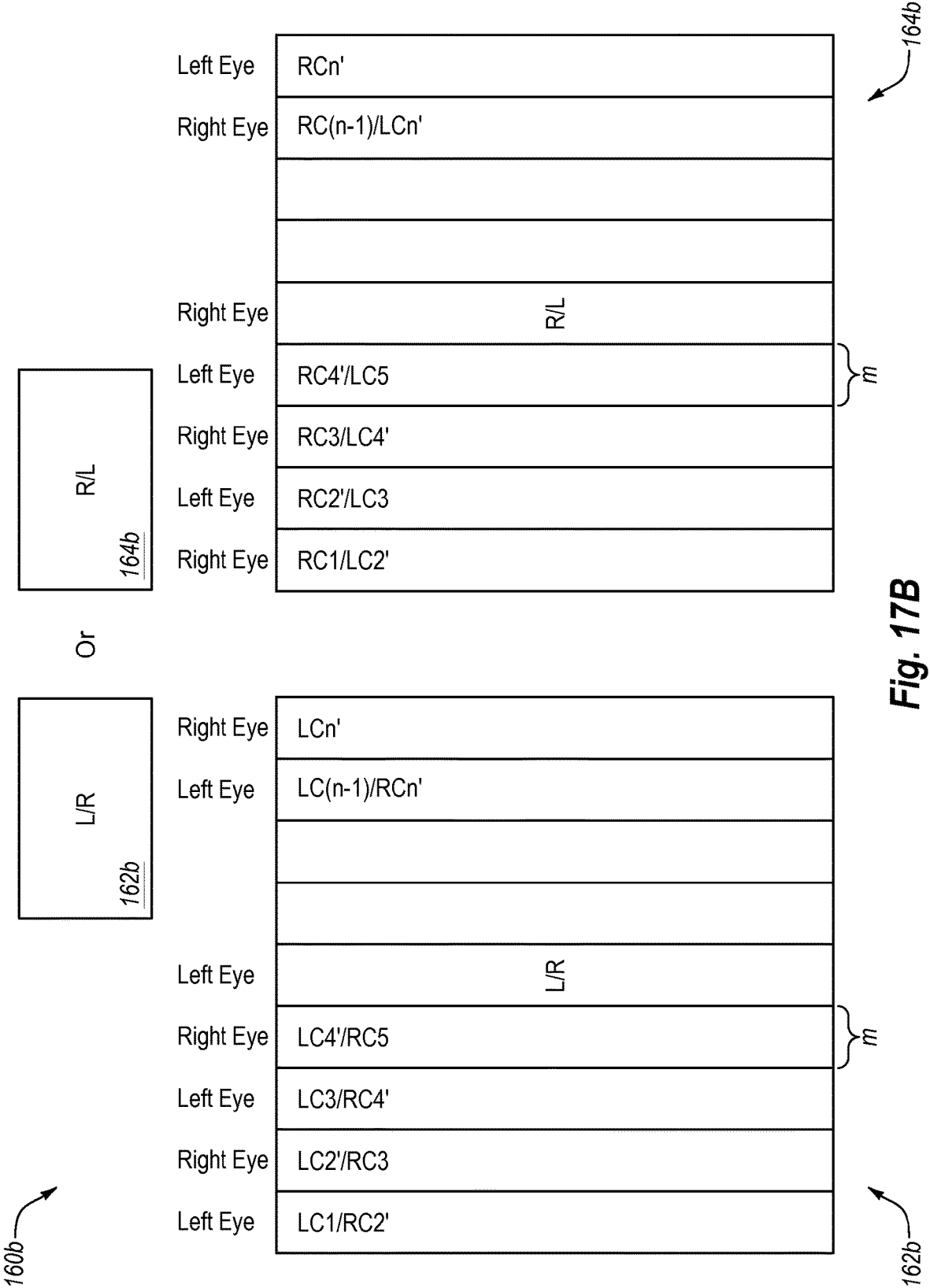
FIG. 17B includes a splicing method to splice superimposed pixels columns into a single full frame.

FIG. 17B illustrates another lenticular recombination method 160b for recombining the parsed pixel columns in order to obtain the 3D frame 162b or 3D frame 164b. The pixel columns of FIG. 17B correspond with the pixel rows of FIG. 13B, and thereby the discussion of FIG. 13B can be applied to FIG. 17B except the pixel rows of FIG. 13B are now pixel columns in FIG. 17B. It should be noted that the furthest left column may also be used as a furthest right column such that the sequence starts from the right column and goes to the left column such that the furthest left columns are: LC1/RC2' or RC1/LC2'. Spliced image 162b can include the superimposed pixel rows in sequence: LC1/RC2' (left eye), LC2'/RC3 (right eye), LC3/RC4' (left eye), LC4'/RC5 (right eye), and so on up to LC(n−1)/RCn' (left eye), and LCn' (right eye). The spliced image 164b can include the superimposed pixel rows in sequence: RC1/LC2' (right eye), RC2'/LC3 (left eye), RC3/LC4' (right eye), RC4'/LC5 (left eye), and so on up to RC(n−1)/LCn' (right eye), and RCn' (left eye).

In one embodiment, a computing method of preparing a 3D image in accordance with FIG. 17B can include: obtaining a plurality of pixel columns for a specific eye and a plurality of pixel columns for the other eye; obtaining a plurality of inverted pixel columns for the specific eye and a plurality of inverted pixel columns for the other eye; and superimposing the corresponding pixel columns and inverted pixel columns to form a plurality of superimposed pixel columns that include pixels having pixel data from corresponding pixels of the superimposed pixel rows and inverted pixel columns; forming a 3D image of superimposed pixel columns with the top and/or bottom and/or right-most and/or left most pixel columns having: a superimposed pixel column formed from a left pixel column from a first location and a right inverted pixel column from the second location; or a superimposed pixel column formed from a right pixel column from a first location and left inverted pixel column from the second location. The method can include preparing the inverted pixel columns.

The lenticular recombination methods can be used to provide for a 3D image with a device configured to display a lenticular 3D image. These lenticular 3D images can be combined to provide lenticular 3D video. The lenticular images are referred to as such for simplicity, however, it should be recognized that the 3D frames can be used for other glasses 3D rendering techniques. Also, the frames of FIGS. 17A-17B correspond with the frames of FIGS. 13A-13B.

Generally, the lenticular parsing and recombination methods described herein can be used for technologies that are configured to display 3D images and/or video without the use of glasses. However, the display screens that use the lenticular methods can have some modification for filtering the images for left eye specific sub-frame and right eye specific sub-frames in order to view the 3D imagery. Some examples of lenticular devices can include LED screens, mobile devices, posters, cards, or others. The lenticular methods may be used with or without using the resizing protocol that resizes the images in the horizontal or vertical planes by estimating the value of a new pixel that is generated to be located between adjacent pixels that have been separated, such as shown in FIGS. 3-4.

The parsing and recombination methods described herein performed with parsing of horizontal pixel rows and then recombining or splicing the pixel rows into frames can generally be conducted with 3D methods configured for display devices, such as 3D televisions and computer monitors. The image resizing protocol for resizing in the horizontal or vertical planes can be combined with the image parsing and recombination or splicing techniques in order to provide substantially 100% resolution or full high definition 3D video. The parsing and recombination or splicing methods combined with the image resizing can be configured selectively for application to SXS protocols or other protocols that use passive polarized 3D glasses as well as for TB protocols. FP protocols can be used without image resizing when configured for use with active shutter 3D glasses; however, the FP protocol can be used with image resizing when configured for use with passive polarized 3D glasses.

In one embodiment, a computing method can generate a specific 3D image having one or two pixel strips and the rest being superimposed pixel strips, such as described in connection with FIGS. 11 and 15. Such a method can include: obtaining a plurality of pixel strips for a specific eye and a plurality of pixel strips for the other eye; obtaining a plurality of inverted pixel strips for the specific eye and a plurality of inverted pixel strips for the other eye; superimposing the corresponding pixel strips and inverted pixel strips to form a plurality of superimposed pixel strips that include pixels having pixel data from corresponding pixels of the superimposed pixel strips and inverted pixel strips; and forming a 3D image having a top and/or bottom pixel strip with the rest being superimposed pixel strips such that at least one pixel strip is not a superimposed pixel strip. This can include preparing the inverted pixel strips. The pixel strips for the specific eye can be superimposed with corresponding inverted pixel strips for the other eye. The superimposed pixel strips can include a first pixel strip of a first pixel strip location of a first image for the specific eye and a second inverted pixel strip of a second pixel strip location of a second image for the other eye, wherein the first and second pixel strip locations are adjacent pixel strip locations in the first image and the second image. The method can include obtaining a first pixel strip for the specific eye or other eye, which first pixel strip is a top or bottom pixel row or a furthest left or right pixel column, and including the first pixel strip in its location in the 3D image. The superimposing of the pixel strips can include: identifying data of each pixel of the pixel strips and for the inverted pixel strips; and combining the data of each pixel of the pixel strip with data of the corresponding pixel of the inverted pixel strip in order to prepare the superimposed pixel strips, wherein the pixel strip is from a first location in a first image and the inverted pixel strip is from a second location in a second image, the first location being adjacent to the second location in the first image and second image. The method can include combining pixel data for the pixels of the pixel strips and pixel data for the pixels of the inverted pixel strips such that data of superimposed pixels is based on data from both the pixel strip and inverted pixel strip. The method can include individually superimposing individual pixels of the pixel strips and inverted pixel strips to form superimposed pixels of the superimposed pixel strips.

The 3D image that includes one or more pixel strips and a plurality of superimposed pixel strips can be rendered, which can be performed with any method described herein, particularly the methods related to FIGS. 11 (pixel strips are pixel rows) and 15 (pixel strips are pixel columns). The 3D image can include a top, bottom, right-most, or left-most pixel strip having left eye pixel strip to be seen by a left eye or a right eye pixel strip to be seen by a right eye. The 3D image can include a top, bottom, right-most, or left-most pixel strip having left eye pixel strip to be seen by a left eye from a first location. The 3D image can include: a next to top, next to bottom, next to right-most, or next to left most pixel strip having a superimposed pixel strip formed from a left eye inverted pixel strip from a second location and a right eye pixel strip from a first location to be seen by the right eye. The 3D image can include a second to top, second to bottom, second to right-most, or second to left most pixel strip having a superimposed pixel strip formed from a left eye pixel strip from a third location and a right eye inverted pixel strip from a second location to be seen by the left eye. The 3D image can include a third to top, third to bottom, third to right-most, or third to left most pixel strip having a superimposed pixel strip formed from a left eye inverted pixel strip from a fourth location and a right eye pixel strip from a third location to be seen by the right eye.

The 3D image can include: a top, bottom, right-most, or left-most pixel strip having left eye pixel strip to be seen by a left eye from a second location. The 3D image can include: a next to top, next to bottom, next to right-most, or next to left most pixel strip having a superimposed pixel strip formed from a left eye inverted pixel strip from a third location and a right eye pixel strip from a second location to be seen by the right eye. The 3D image can include a second to top, second to bottom, second to right-most, or second to left most pixel strip having a superimposed pixel strip formed from a left eye pixel strip from a fourth location and a right eye inverted pixel strip from a third location to be seen by the left eye. The 3D image can include a third to top, third to bottom, third to right-most, or third to left most pixel strip having a superimposed pixel strip formed from a left eye inverted pixel strip from a fifth location and a right eye pixel strip from a fourth location to be seen by the right eye.

The 3D image can include a top, bottom, right-most, or left-most pixel strip having right eye pixel strip to be seen by a right eye from a first location. The 3D image can include: a next to top, next to bottom, next to right-most, or next to left most pixel strip having a superimposed pixel strip formed from a right eye inverted pixel strip from a second location and a left eye pixel strip from a first location to be seen by the left eye. The 3D image can include a second to top, second to bottom, second to right-most, or second to left most pixel strip having a superimposed pixel strip formed from a right eye pixel strip from a third location and a left eye inverted pixel strip from a second location to be seen by the right eye. The 3D image can include a third to top, third to bottom, third to right-most, or third to left most pixel strip having a superimposed pixel strip formed from a right eye inverted pixel strip from a fourth location and a left eye pixel strip from a third location to be seen by the left eye.

The 3D image can include: a top, bottom, right-most, or left-most pixel strip having right eye pixel strip to be seen by a right eye from a second location. The 3D image can include: a next to top, next to bottom, next to right-most, or next to left most pixel strip having a superimposed pixel strip formed from a right eye inverted pixel strip from a third location and a left eye pixel strip from a second location to be seen by the left eye. The 3D image can include a second to top, second to bottom, second to right-most, or second to left most pixel strip having a superimposed pixel strip formed from a fight eye pixel strip from a fourth location and a left eye inverted pixel strip from a third location to be seen by the right eye. The 3D image can include a third to top, third to bottom, third to right-most, or third to left most pixel strip having a superimposed pixel strip formed from a right eye inverted pixel strip from a fifth location and a left eye pixel strip from a fourth location to be seen by the left eye.

The 3D image can include a top, bottom, right-most, or left most pixel strip having a superimposed pixel strip formed from a left eye inverted pixel strip from an "n" location and a right eye pixel strip from an (n−1) location or from a left eye pixel strip from an (n−1) location and a right eye inverted pixel strip from an "n" location to be seen by the left eye. These orientations can be obtained by any of the methods.

The following orientations can be obtained by the methods related to FIGS. 11 (pixel strips are pixel rows) and 15 (pixel strips are pixel columns). The 3D image can include pixel strip L1 to be seen by the left eye and an adjacent superimposed pixel strip R1/L2' to be seen by right eye resulting from superimposing the pixels of pixel strip R1 and inverted pixels of inverted pixel strip L2', wherein primes indicated inverted pixel strips. The 3D image can include: superimposed pixel strip L3/R2' to be seen by left eye, superimposed pixel strip R3/L4' to be seen by right eye, superimposed pixel strip L5/R4' to be seen by left eye, superimposed pixel strip R5/L6' to be seen by right eye, and so on up to superimposed pixel strip R(n−1)/Ln' to be seen by right eye, wherein primes indicated inverted pixel strips. The 3D image can include pixel strip L2 to be seen by the left eye and an adjacent superimposed pixel strip R2/L3' to be seen by right eye resulting from superimposing the pixels of pixel strip R2 and inverted pixels of inverted pixel strip L3', wherein primes indicated inverted pixel strips. The 3D image can include: superimposed pixel strip L4/R3' to be seen by left eye, superimposed pixel strip R4/L5' to be seen by right eye, superimposed pixel strip L6/R5' to be seen by left eye, superimposed pixel strip R6/L7' to be seen by right eye, and so on up to superimposed pixel strip R(n−1)/Ln' to be seen by right eye, wherein primes indicated inverted pixel strips. The 3D image can include pixel strip R1 to be seen by the right eye and an adjacent superimposed pixel strip L1/R2' to be seen by left eye resulting from superimposing the pixels of pixel strip L1 and inverted pixels of inverted pixel strip R2', wherein primes indicated inverted pixel strips. The 3D image can include: superimposed pixel strip R3/L2' to be seen by right eye, superimposed pixel strip L3/R4' to be seen by left eye, superimposed pixel strip R5/L4' to be seen by right eye, superimposed pixel strip L5/R6' to be seen by left eye, and so on up to superimposed pixel strip L(n−1)/Rn' to be seen by left eye, wherein primes indicated inverted pixel strips. The 3D image can include pixel strip R2 to be seen by the right eye and an adjacent superimposed pixel strip L2/R3' to be seen by left eye resulting from superimposing the pixels of pixel strip L2 and inverted pixels of inverted pixel strip R3', wherein primes indicated inverted pixel strips. The 3D image can include: superimposed pixel strip R4/L3' to be seen by right eye, superimposed pixel strip L4/R5' to be seen by left eye, superimposed pixel strip R6/L5' to be seen by right eye, superimposed pixel strip L6/R7' to be seen by left eye, and so on up to superimposed pixel strip L(n−1)/Rn' to be seen by left eye, wherein primes indicated inverted pixel strips. With regard to FIG. 15, the R pixel strips are RC pixel columns and the L pixel strips are LC pixel columns.

Any of the methods that use pixel columns can include preparing the 3D image from pixel columns and inverted pixel columns of a left eye image and pixel columns and inverted pixel columns of a right eye image, which can include: obtaining a plurality of right eye pixel columns; obtaining a plurality of inverted right eye pixel columns; obtaining a plurality of left eye pixel columns; obtaining a plurality of inverted left eye pixel columns; and preparing a plurality of superimposed pixel columns that each include a pixel column for a left or right eye from a first location and an inverted pixel columns for the other eye from a second location adjacent to the first location. Then, the method can include rendering a 3D image that includes one or more pixel columns and a plurality of superimposed pixel columns.

In one embodiment, a computing method can generate a specific 3D image having superimposed pixel strips, such as described in connection with FIGS. 13A and 17A. Such a method of preparing a 3D image can include: obtaining a plurality of pixel strips for a specific eye and a plurality of pixel strips for the other eye; obtaining a plurality of inverted pixel strips for the specific eye and a plurality of inverted pixel strips for the other eye; and superimposing the corresponding pixel strips and inverted pixel strips to form a plurality of superimposed pixel strips that include pixels having pixel data from corresponding pixels of the superimposed pixel strips and inverted pixel strips; forming a 3D image of superimposed pixel strips with the top and/or bottom and/or right-most and/or left most pixel strip having: a superimposed pixel strip formed from a left pixel strip from a first location and a right inverted pixel strip from the first location; or a superimposed pixel strip formed from a right pixel strip from a first location and left inverted pixel strip from the first location. The method can include preparing the inverted pixel strips. The pixel strips for the specific eye can be superimposed with corresponding inverted pixel strips for the other eye. The superimposed pixel strips can include a first pixel strip of a first pixel strip location of a first image for the specific eye and a first inverted pixel strip of a first pixel strip location of a second image for the other eye, wherein the first pixel strip locations are the same pixel strip locations in the first image and the second image. In one aspect, the 3D image consists of only superimposed pixel strips, that is all of the pixel strips are superimposed. The superimposing of the pixel strips can include: identifying data of each pixel of the pixel strips and for the inverted pixel strips; and combining the data of each pixel of the pixel strip with data of the corresponding pixel of the inverted pixel strip in order to prepare the superimposed pixel strips, wherein the pixel strip is from a first location in a first image and the inverted pixel is from the first location in a second image. The method can include combining pixel data for the pixels of the pixel strips and pixel data for the pixels of the inverted pixel strips such that data of superimposed pixels is based on data from both the pixel strip and inverted pixel strip. The method can include individually superimposing individual pixels of the pixel strips and inverted pixel strips to form superimposed pixels of the superimposed pixel strips. The 3D image can configured for being viewed with a lenticular system, such as under the method of FIG. 17A. The 3D image can be configured for being viewed with active or passive 3D glasses, such as under the method of FIG. 13A.

In one embodiment, a method of rendering a 3D image that consists of superimposed pixel strips formed from pixel strips and inverted pixel strips from the same locations can be performed. The 3D image can include: a top, bottom, right-most, or left-most superimposed pixel strip formed from a left eye pixel strip and an inverted right eye pixel strip, both from a first location; a next to top, next to bottom, next to right-most, or next to left most pixel strip having a superimposed pixel strip formed from a left eye inverted pixel strip from a second location and a right eye pixel strip from the second location to be seen by the right eye; a second to top, second to bottom, second to right-most, or second to left most pixel strip having a superimposed pixel strip formed from a left eye pixel strip from a third location and a right eye inverted pixel strip from the third location to be seen by the left eye; and a third to top, third to bottom, third to right-most, or third to left most pixel strip having a superimposed pixel strip formed from a left eye inverted pixel strip from a fourth location and a right eye pixel strip from the fourth location to be seen by the right eye. Here, the inverted and non-inverted pixel strips can be right eye or left eye, as shown in frame 132*a* and frame 134*a*. In one aspect, the 3D image includes a top, bottom, right-most, or left most pixel strip having a superimposed pixel strip formed from a left eye inverted pixel strip from an "n" location and a right eye pixel strip from an n location or from a left eye pixel strip from an n location and a right eye inverted pixel strip from an n location to be seen by the left eye.

In one embodiment, with regard to FIGS. 13A and 17A the 3D image can include: a superimposed pixel strip L1/R1' to be seen by left eye resulting from superimposing the pixels of pixel strip L1 and inverted pixels of inverted pixel strip R1', wherein primes indicated inverted pixel strips; superimposed pixel strip L2'/R2 to be seen by right eye, superimposed pixel strip L3/R3' to be seen by left eye, superimposed pixel strip L4'/R4 to be seen by right eye, superimposed pixel strip L5/R5' to be seen by left eye, and so on up to superimposed pixel strip Ln/Rn' to be seen by left eye, wherein primes indicated inverted pixel strips. In another embodiment, the 3D image includes: a superimposed pixel strip R1/L1' to be seen by right eye resulting from superimposing the pixels of pixel strip R1 and inverted pixels of inverted pixel strip L1', wherein primes indicated inverted pixel strips; superimposed pixel strip R2'/L2 to be seen by left eye, superimposed pixel strip R3/L3' to be seen by right eye, superimposed pixel strip R4'/L4 to be seen by left eye, superimposed pixel strip R5/L5' to be seen by right eye, and so on up to superimposed pixel strip Rn/Ln' to be seen by right eye, wherein primes indicated inverted pixel strips. With regard to FIG. 13A, the pixel strips are pixel rows. With regard to FIG. 17A, the R pixel strips are RC pixel columns and the L pixel strips are LC pixel columns.

In one embodiment, a computing method can generate a specific 3D image having superimposed pixel strips, such as described in connection with FIGS. 13B and 17B. The method can be similar to the methods recited herein and can include forming a 3D image having a top and/or bottom inverted pixel strip with the rest being superimposed pixel strips such that at least one pixel strip is not a superimposed pixel strip. The method can also include obtaining a first inverted pixel strip for the specific eye or other eye, which first pixel strip is a top or bottom pixel row or a furthest left or right pixel column, and including the first inverted pixel strip in its location in the 3D image. The method can include rendering a 3D image that includes: one or more inverted pixel strips and a plurality of superimposed pixel strips; a top, bottom, right-most, or left-most pixel strip having a superimposed pixel strip formed from a left eye pixel strip from a first location and an inverted right eye pixel strip from a second location to be seen by a left eye; a next to top, next to bottom, next to right-most, or next to left most pixel strip having a superimposed pixel strip formed from a left eye inverted pixel strip from a second location and a right eye pixel strip from a third location to be seen by the right eye; a second to top, second to bottom, second to right-most, or second to left most pixel strip having a superimposed pixel strip formed from a left eye pixel strip from a third location and a right eye inverted pixel strip from a fourth location to be seen by the left eye; a third to top, third to bottom, third to right-most, or third to left most pixel strip having a superimposed pixel strip formed from a left eye inverted pixel strip from a fourth location and a right eye pixel strip from a fifth location to be seen by the right eye; and a top, bottom, right-most, or left most pixel strip having a left eye inverted pixel strip from an "n" location to be seen by the right eye. The method can also result in a 3D image that includes: a top, bottom, right-most, or left-most pixel strip having a superimposed pixel strip formed from a right eye pixel strip from a first location and an inverted left eye pixel strip from a second location to be seen by a right eye; a next to top, next to bottom, next to right-most, or next to left most pixel strip having a superimposed pixel strip formed from a right eye inverted pixel strip from a second location and a left eye pixel strip from a third location to be seen by the left eye; a second to top, second to bottom, second to right-most, or second to left most pixel strip having a superimposed pixel strip formed from a right eye pixel strip from a third location and a left eye inverted pixel strip from a fourth location to be seen by the right eye; a third to top, third to bottom, third to right-most, or third to left most pixel strip having a superimposed pixel strip formed from a right eye inverted pixel strip from a fourth location and a left eye pixel strip from a fifth location to be seen by the left eye; and a top, bottom, right-most, or left most pixel strip having a right eye inverted pixel strip from an "n" location to be seen by the left eye.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

In one embodiment, the present methods can include aspects performed on a computing system. As such, the computing system can include a memory device that has the computer-executable instructions for performing the method. The computer-executable instructions can be part of a computer program product that includes one or more algorithms for performing any of the methods of any of the claims.

In one embodiment, any of the operations, processes, methods, or steps described herein can be implemented as computer-readable instructions stored on a computer-readable medium. The computer-readable instructions can be executed by a processor of a wide range of computing systems from desktop computing systems, portable computing systems, tablet computing systems, hand-held computing systems, televisions, monitors, 3D televisions, 3D components, 3D video players, 3D monitors, 3D display screens, active 3D display screens, passive 3D display screens, and/or any other computing device relevant to the disclosure provided herein.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Figure 6:
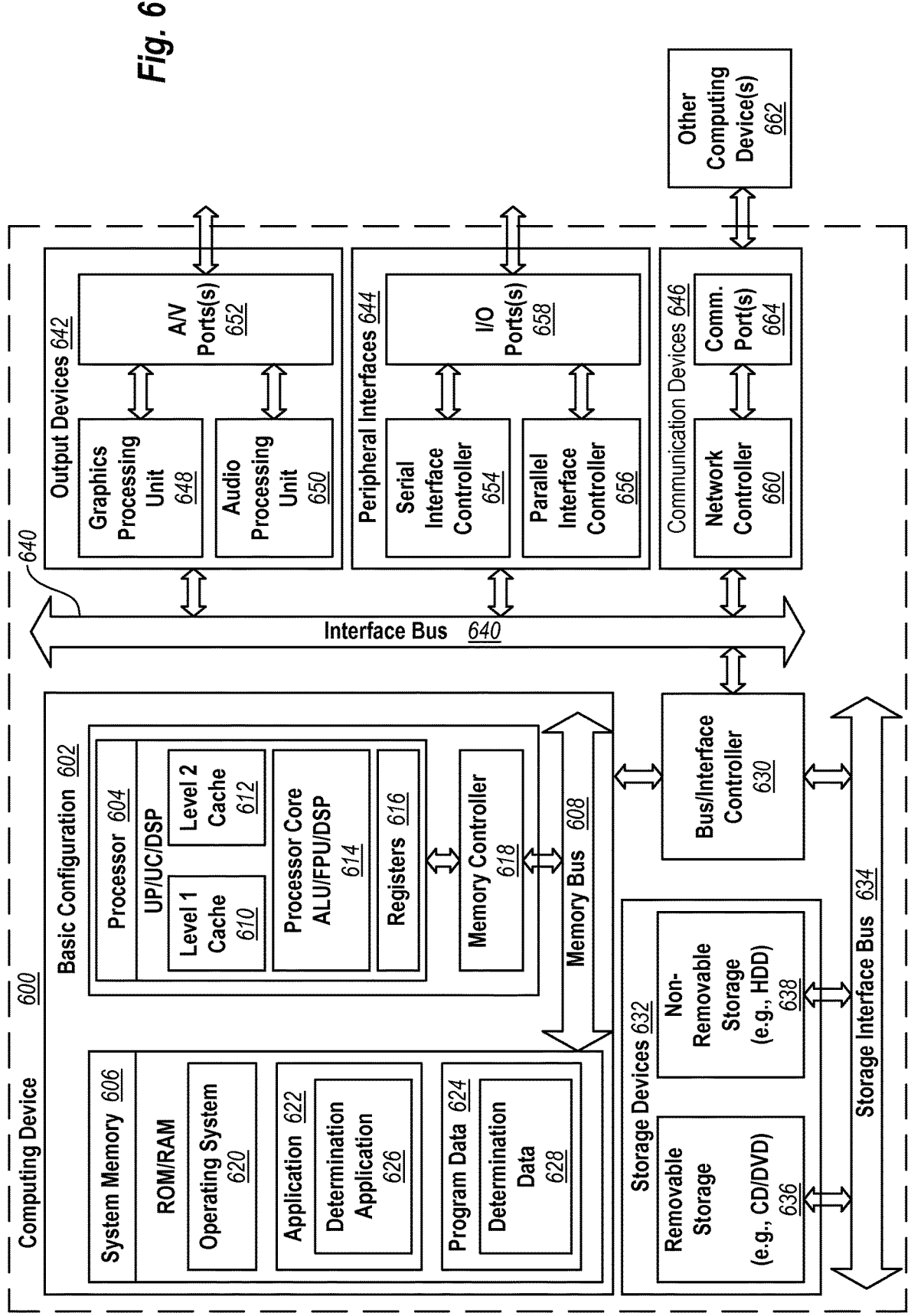
FIG. 6 includes a schematic representation of a computing device 600 that can be a computing system configured to operate with the present invention.

FIG. 6 shows an example computing device 600 that is arranged to perform any of the computing methods described herein. In a very basic configuration 602, computing device 600 generally includes one or more processors 604 and a system memory 606. A memory bus 608 may be used for communicating between processor 604 and system memory 606. The computing device can be configured with standard computer components, such as the following: processor 604, level one cache 610, level two cache 612, a processor core 614, registers 616; memory controller 618; system memory 606; operating system 620; one or more applications 622, program data 624; determination application 626; determination information 628; sensor unit 240; bus/interface controller 630; one or more data storage devices 632; storage interface bus 634; removable storage devices 636; non-removable storage devices 638; interface bus 640; various interface devices (e.g., output devices 642, peripheral interfaces 644, and communication devices 646); a graphics processing unit 648; audio processing unit 650; one or more A/V ports 652; serial interface controller 654; a parallel interface controller 656; one or more I/O ports 658; a network controller 660; and one or more other computing devices 662 connected over a network communication link via one or more communication ports 664. The computing device can be a 3D TV.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

All references recited herein are incorporated herein by specific reference in their entirety.

The invention claimed is:

1. A method comprising:
receiving a first pixel strip of first pixels of a first sub-frame image that is derived from a full two-dimensional (2D) format image, the first pixels having first pixel data;
receiving a second pixel strip of second pixels of a second sub-frame image that is derived from the full 2D image, one or more of the first pixels corresponding to one or more of the second pixels in a three-dimensional (3D) image rendered based on the first and second sub-frame images, the corresponding one or more first and second pixels being displaced in location with respect to each other;
inverting the second pixel strip into an inverted second pixel strip based on the displaced locations of the one or more first pixels with respect to their corresponding second pixels, the inverted second pixel strip including inverted second pixels having inverted second pixel data, wherein the inverting includes:
determining a displacement direction of a second pixel with respect to a corresponding first pixel, wherein the second pixel includes second pixel data;
determining a displacement distance of the second pixel with respect to the corresponding first pixel;
determining, based on the determined first direction, a second direction that is opposite the first direction;
determining, based on the determined displacement distance and second direction, an inverted second pixel of the inverted second pixel strip that is displaced with respect to the first pixel by the displacement distance in the second direction; and
including the second pixel data in the inverted second pixel in response to determining that the inverted second pixel is displaced with respect to the first pixel by the displacement distance in the second direction; and rendering the 3D image to include a superimposed pixel strip that is based on the inverted second pixel strip and the first pixel strip.

2. The method of claim 1, further comprising superimposing the inverted second pixel strip with the first pixel strip to form the superimposed pixel strip, wherein superimposing the inverted second pixel strip with the first pixel strip includes superimposing the inverted second pixel data of the inverted second pixels with the first pixel data of the first pixels to generate superimposed pixel data and including the superimposed pixel data in superimposed pixels of the superimposed pixel strip.

3. The method of claim 2, further comprising:
weighting the superimposed pixel data to include more first pixel data than inverted second pixel data; or
weighting the superimposed pixel data to include more inverted second pixel data than first pixel data.

4. The method of claim 2, further comprising deriving the superimposed pixel data ("X") from the first pixel data ("A") and the inverted second pixel data ("B") based on the expression $X=(A+B)/2$.

5. The method of claim 2, further comprising deriving the superimposed pixel data ("Y") from the first pixel data ("A") and the inverted second pixel data ("B") based on the expressions $X=(A+B)/2$ and $Y=(X+A)/2$.

6. The method of claim 2, further comprising deriving the superimposed pixel data ("Y") from the first pixel data ("A") and the inverted second pixel data ("B") based on the expressions $X=(A+B)/2$ and $Y=(X+B)/2$.

7. The method of claim 1, wherein at least one non-transitory computer readable media is configured to store one or more instructions that, in response to being executed by at least one processor, cause a system to perform the method of claim 1.

8. A method comprising:
receiving a first pixel strip of first pixels of a first sub-frame image that is derived from a full two-dimensional (2D) format image, the first pixels having first pixel data;
receiving a second pixel strip of second pixels of a second sub-frame image that is derived from the full 2D image, one or more of the first pixels corresponding to one or more of the second pixels in a three-dimensional (3D) image rendered based on the first and second sub-frame images, the corresponding one or more first and second pixels being displaced in location with respect to each other;
inverting the second pixel strip into an inverted second pixel strip based on the displaced locations of the one or more first pixels with respect to their corresponding second pixels, the inverted second pixel strip including inverted second pixels having inverted second pixel data;
superimposing the inverted second pixel data of the inverted second pixels with the first pixel data of the first pixels to generate superimposed pixel data;
forming a superimposed pixel strip that includes superimposed pixels that include the superimposed pixel data; and
rendering the 3D image to include the superimposed pixel strip.

9. The method of claim 8, wherein the inverting includes:
determining a displacement direction of a second pixel with respect to a corresponding first pixel, wherein the second pixel includes second pixel data;
determining a displacement distance of the second pixel with respect to the corresponding first pixel;
determining, based on the determined first direction, a second direction that is opposite the first direction;
determining, based on the determined displacement distance and second direction, an inverted second pixel of the inverted second pixel strip that is displaced with respect to the first pixel by the displacement distance in the second direction; and
including the second pixel data in the inverted second pixel in response to determining that the inverted second pixel is displaced with respect to the first pixel by the displacement distance in the second direction.

10. The method of claim 8, further comprising:
weighting the superimposed pixel data to include more first pixel data than inverted second pixel data; or
weighting the superimposed pixel data to include more inverted second pixel data than first pixel data.

11. The method of claim 8, further comprising deriving the superimposed pixel data ("X") from the first pixel data ("A") and the inverted second pixel data ("B") based on the expression $X=(A+B)/2$.

12. The method of claim 8, further comprising deriving the superimposed pixel data ("Y") from the first pixel data ("A") and the inverted second pixel data ("B") based on the expressions $X=(A+B)/2$ and $Y=(X+A)/2$.

13. The method of claim 8, further comprising deriving the superimposed pixel data ("Y") from the first pixel data ("A") and the inverted second pixel data ("B") based on the expressions $X=(A+B)/2$ and $Y=(X+B)/2$.

14. The method of claim 8, wherein at least one non-transitory computer readable media is configured to store one or more instructions that, in response to being executed by at least one processor, cause a system to perform the method of claim 8.

* * * * *